United States Patent
Toume

(10) Patent No.: US 8,156,091 B2
(45) Date of Patent: Apr. 10, 2012

(54) METHOD TO RETAIN AN INHERENT AND INDELIBLE ITEM VALUE IN A RELATIONAL DATABASE MANAGEMENT SYSTEM

(75) Inventor: Naotsugu Toume, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 427 days.

(21) Appl. No.: 12/512,658

(22) Filed: Jul. 30, 2009

(65) Prior Publication Data

US 2010/0235380 A1 Sep. 16, 2010

(30) Foreign Application Priority Data

Mar. 11, 2009 (JP) .................... 2009-057380

(51) Int. Cl.
G06F 17/00 (2006.01)
(52) U.S. Cl. ........................................ 707/696
(58) Field of Classification Search ............... 707/696
See application file for complete search history.

(56) References Cited

U.S. PATENT DOCUMENTS

| | | | | |
|---|---|---|---|---|
| 5,974,453 A | * | 10/1999 | Andersen et al. | 709/220 |
| 7,065,526 B2 | * | 6/2006 | Wissner et al. | 707/770 |
| 2009/0043864 A1 | * | 2/2009 | Shetty | 709/217 |
| 2009/0112981 A1 | * | 4/2009 | Markovich | 709/203 |
| 2010/0082690 A1 | * | 4/2010 | Kenigsberg et al. | 707/792 |

OTHER PUBLICATIONS

Bauer, Christian, et al.; "Mapping Persistent Classes" extracted from the book "Hibernate in Action"; Oct. 2004; pp. 95-106; Manning Publications Co., Greenwich, USA.

* cited by examiner

Primary Examiner — James Trujillo
Assistant Examiner — Kurt Mueller
(74) Attorney, Agent, or Firm — Foley & Lardner LLP

(57) ABSTRACT

A data processing apparatus, a data processing method, and a data processing program for use in a data processing system is provided, the system including the data processing apparatus which includes an RDBMS storing information shared among a plurality of organizations and a business application execution apparatus which is employed when either one of the organizations uses the information stored in the RDBMS of the data processing apparatus and which is communicably connected to the data processing apparatus. An inherent item table managed by the data processing apparatus is kept unchanged even if an organization is added.

9 Claims, 28 Drawing Sheets

FIG. 4

211
SHARED ITEM TABLE

| ID (401) | FIRM NAME (402) | LOCATION (403) | REPRESENTATIVE (404) |
|---|---|---|---|
| 100 | FIRM A | TOKYO | |
| 200 | FIRM B | OHSAKA | |
| 300 | FIRM C | FUKUOKA | |

212
INHERENT ITEM TABLE MANAGING TABLE

| TYPE (411) | INHERENT ITEM TABLE NAME (412) |
|---|---|
| VARCHAR | VARCHAR-TYPE INHERENT ITEM TABLE |
| INT | INT-TYPE INHERENT ITEM TABLE |
| DATE | DATE-TYPE INHERENT ITEM TABLE |

FIG. 5

VARCHAR-TYPE INHERENT ITEM TABLE — 221

| ID (501) | USING ORGANIZATION (502) | ITEM NAME (503) | ITEM VALUE (504) |
|---|---|---|---|
| 100 | SALES | SALESPERSON | YAMADA ICHIRO |
| 100 | SALES | SALESPERSON CONTACT PHONE NUMBER | 03-1111-2222 |
| 200 | SALES | SALESPERSON | TANAKA JIRO |
| 200 | SALES | SALESPERSON CONTACT PHONE NUMBER | 01-222-3333 |
| 300 | SALES | SALESPERSON | NAKAMURA SABURO |
| 300 | SALES | SALESPERSON CONTACT PHONE NUMBER | 09-123-4567 |
| 100 | SUPPLY | ISO9001 APPROVAL STATE | APPROVED |
| 200 | SUPPLY | ISO9001 APPROVAL STATE | NOT APPROVED |
| 300 | SUPPLY | ISO9001 APPROVAL STATE | APPROVED |

INT-TYPE INHERENT ITEM TABLE — 222

| ID (501) | USING ORGANIZATION (502) | ITEM NAME (503) | ITEM VALUE (504) |
|---|---|---|---|
| 100 | SUPPLY | ISO9001 APPROVAL STATE | 19000 |
| 200 | SUPPLY | ISO9001 APPROVAL STATE | NULL |
| 300 | SUPPLY | ISO9001 APPROVAL STATE | 21000 |

DATE-TYPE INHERENT ITEM TABLE — 223

| ID (501) | USING ORGANIZATION (502) | ITEM NAME (503) | ITEM VALUE (504) |
|---|---|---|---|
| 100 | SUPPLY | ISO9001 APPROVAL DATE | 2008/4/1 |
| 200 | SUPPLY | ISO9001 APPROVAL DATE | NULL |
| 300 | SUPPLY | ISO9001 APPROVAL DATE | 2008/7/10 |

FIG. 6

ITEM LIST TABLE (600)

| ITEM NAME | ITEM TYPE | INHERENT ITEM SEARCH CONDITIONAL EXPRESSION |
|---|---|---|
| FIRM NAME | SHARED ITEM | |
| LOCATION | SHARED ITEM | |
| SALESPERSON | INHERENT ITEM | USING ORGANIZATION='SALES' AND ITEM NAME='SALESPERSON' |
| SALESPERSON CONTACT PHONE NUMBER | INHERENT ITEM | USING ORGANIZATION='SALES' AND ITEM NAME='SALESPERSON CONTACT PHONE NUMBER' |

601 / 602 / 603

VIRTUAL ROW (610)

| ID | FIRM NAME | LOCATION | SALESPERSON | SALESPERSON CONTACT PHONE NUMBER |
|---|---|---|---|---|
| | | | | |

INHERENT ITEM MANAGING TABLE

| ORGANIZATION NAME | INHERENT ITEM NAME | TYPE | INHERENT ITEM TABLE NAME |
|---|---|---|---|
| SALES | SALESPERSON | VARCHAR | VARCHAR-TYPE INHERENT ITEM TABLE |
| SALES | SALESPERSON CONTACT PHONE NUMBER | VARCHAR | VARCHAR-TYPE INHERENT ITEM TABLE |
| SUPPLY | ISO9001 APPROVAL STATE | VARCHAR | VARCHAR-TYPE INHERENT ITEM TABLE |
| SUPPLY | ISO9001 APPROVAL NUMBER | INT | INT-TYPE INHERENT ITEM TABLE |
| SUPPLY | ISO9001 APPROVAL DATE | DATE | DATE-TYPE INHERENT ITEM TABLE |

FIG.22

SQL STATEMENT EXAMPLE TO                                2201
DEFINE VIEW TABLE "SALES_SALESPERSON"

```
1: CREATE VIEW 'SALES_SALESPERSON' AS
2:   SELECT ID, 'ITEM VALUE' AS 'SALESPERSON'
3:   FROM VARCHAR INHERENT ITEM TABLE
4:   WHERE 'USING ORGANIZATION' = 'SALES'
     AND 'ITEM NAME' = 'SALESPERSON'
```

EXAMPLE OF VIEW TABLE "SALES_SALESPERSON"   — 2210

| ID (2211) | SALESPERSON (2212) |
|---|---|
| 100 | YAMADA ICHIRO |
| 200 | TANAKA JIRO |
| 300 | NAKAMURA SABURO |

SQL STATEMENT EXAMPLE TO DEFINE VIEW TABLE      2202
"SALES_SALESPERSON CONTACT PHONE NUMBER"

```
1: CREATE VIEW 'SALES_SALESPERSON' AS
2:   SELECT ID, 'ITEM VALUE' AS 'SALESPERSON'
3:   FROM VARCHAR INHERENT ITEM TABLE
4:   WHERE 'USING ORGANIZATION' = 'SALES'
     AND 'ITEM NAME' = 'SALESPERSON CONTACT PHONE NUMBER'
```

EXAMPLE OF VIEW TABLE
"SALES_SALESPERSON
CONTACT PHONE NUMBER"   — 2220

| ID (2211) | SALESPERSON CONTACT PHONE NUMBER (2213) |
|---|---|
| 100 | 03-1111-2222 |
| 200 | 01-222-3333 |
| 300 | 09-123-4567 |

SQL STATEMENT EXAMPLE TO                                2203
DEFINE VIEW TABLE "SALES"

```
1: CREATE VIEW 'SALES' AS
2:   SELECT ID, 'FIRM', 'LOCATION', 'REPRESENTATIVE'
     'SALESPERSON', 'SALESPERSON CONTACT PHONE NUMBER'
3:   FROM 'SHARED ITEM TABLE', 'SALES_SALESPERSON'
     'SALES_SALESPERSON CONTACT PHONE NUMBER'
4:   WHERE 'SHARED ITEM TABLE'.ID= 'SALES_SALESPERSON'.ID
5:     AND 'SHARED ITEM TABLE'.ID= 'SALES_SALESPERSON'.ID
```

FIG.23

SQL STATEMENT EXAMPLE TO
DEFINE VIEW TABLE "SALES"  — 2203

1: CREATE VIEW 'SALES' AS
2: SELECT ID, 'FIRM', 'LOCATION', 'REPRESENTATIVE',
   'SALESPERSON', 'SALESPERSON CONTACT PHONE NUMBER'
3: FROM 'SHARED ITEM TABLE', 'SALES_SALESPERSON',
   'SALES_SALESPERSON CONTACT PHONE NUMBER'
4: WHERE 'SHARED ITEM TABLE'.ID= 'SALES_SALESPERSON'.ID
5:   AND 'SHARED ITEM TABLE'.ID= 'SALES_SALESPERSON'.ID

EXAMPLE OF VIEW TABLE "SALES"  — 2230

| ID | FIRM NAME | LOCATION | REPRESENTATIVE | SALESPERSON | SALESPERSON CONTACT PHONE NUMBER |
|---|---|---|---|---|---|
| 100 | FIRM A | TOKYO | | YAMADA ICHIRO | 03-1111-2222 |
| 200 | FIRM B | OHSAKA | | TANAKA JIRO | 01-222-3333 |
| 300 | FIRM C | FUKUOKA | | NAKAMURA SABURO | 09-123-4567 |

SALES DIVISION INHERENT TABLE

| ID | FIRM NAME | LOCATION | SALESPERSON | SALESPERSON CONTACT PHONE NUMBER |
|---|---|---|---|---|
| 100 | FIRM A | TOKYO | YAMADA ICHIRO | 03-1111-2222 |
| 200 | FIRM B | OHSAKA | TANAKA JIRO | 01-222-3333 |

2602 SHARED ITEM (FIRM NAME, LOCATION)

2611

SUPPLY DIVISION INHERENT TABLE

| ID | FIRM NAME | LOCATION | ISO9001 APPROVAL STATE | ISO9001 APPROVAL NUMBER | ISO9001 APPROVAL DATE |
|---|---|---|---|---|---|
| 100 | FIRM A | TOKYO | APPROVED | 19000 | 2008/4/1 |
| 200 | FIRM B | OHSAKA | NOT APPROVED | NULL | NULL |

2612 SHARED ITEM (FIRM NAME, LOCATION)

FIG.27

| ID | FIRM NAME | LOCATION | SALESPERSON | SALESPERSON CONTACT PHONE NUMBER | ISO9001 APPROVAL STATE | ISO9001 APPROVAL NUMBER | ISO9001 APPROVAL DATE |
|---|---|---|---|---|---|---|---|
| 100 | FIRM A | TOKYO | YAMADA ICHIRO | 03-1111-2222 | APPROVED | 19000 | 2008/4/1 |
| 200 | FIRM B | OHSAKA | TANAKA JIRO | 01-222-3333 | NOT APPROVED | NULL | NULL |

IN-HOUSE SHARED TABLE 2701

2711 SHARED ITEM
2712 SALES DIVISION INHERENT ITEM
2713 SUPPLY DIVISION INHERENT ITEM

METHOD TO RETAIN AN INHERENT AND INDELIBLE ITEM VALUE IN A RELATIONAL DATABASE MANAGEMENT SYSTEM

INCORPORATION BY REFERENCE

The present application claims priority from Japanese application JP2009-057380 filed on Mar. 11, 2009, the content of which is hereby incorporated by reference into this application.

BACKGROUND OF THE INVENTION

The present invention relates to a technique for adding an inherent item, which is to be referred to or to be updated by a particular organization, to information (such as a table) shared among a plurality of organizations in a Relational Data Base Management System (RDBMS).

The RDBMS is a system to manage data shared among a plurality of organizations. For example, in an information system of a firm or a company, corporate information of firms as its customer is stored in the RDBMS to share the corporate information among organizations (e.g., divisions) of the firm. The corporate information is stored in the RDBMS in the form of a table including a plurality of items (columns). A business application (AP; program) accesses the table to refer to or to update the corporate information. The items are, for example, names and locations of the firms.

In such data processing system, the respective organizations desire to use mutually different items depending on cases. FIG. 2 shows an example of this situation in a customer corporate information management system. In the customer corporate information management system 100, in-house organizations such as a sales division and a supply division share customer corporate information 130. However, the respective divisions desire to use different items. A customer management application (sales division customer management AP 110) of the sales division refers to information 111 to use items which store a salesperson and a contact address, e.g., a contact phone number (salesperson contact phone number) of the salesperson of an associated firm. On the other hand, an order application (supply division order AP 120) of the supply division refers to information 121 to use a state of approval and an approval number of International Organization for Standardization (ISO) 9001, i.e., the international standard for quality certification, to thereby determine whether or not a firm under consideration is appropriate as a supplier.

Assume that items shared among the organizations are referred to as shared items and items used only by a particular organization are referred to as inherent items. In the example of FIG. 2, the firm names and the firm locations are shared items. The salesperson and the salesperson contact phone number are inherent items used only by the sales division.

It is not assumed that the one-to-one correspondence exists between the business applications (sales division customer management AP 110 and supply division order AP 120 in this example) and the organizations. Depending on cases, a business application is used by only one organization or by a plurality of organizations. In the former situation, the business application uses inherent items of a particular organization. In the latter case, the business application uses inherent items of organizations to which the users of the application belong. That is, even one business application uses different inherent items depending on users.

In the conventional RDBMS, the inherent items are managed in three methods as below.

According to a first method, for each organization, a table is prepared to store inherent items (which will be described in conjunction with FIG. 25). In a second method, for each organization, a table is prepared to store both of shared items and inherent items (which will be described in conjunction with FIG. 26). In a third method, a table is prepared to store both of shared items and inherent items for the respective organizations (which will be described in conjunction with FIG. 27).

These three methods have been introduced as three mapping patterns provided by Hibernate which is an object/relational mapping tool in wide use, in Section 3.6 "Class Inheritance Mapping" of "Hibernate In Action". Reference is to be made to pages 121 to 131 of "Hibernate In Action" written by Christian Bauer et al, translated by Akira Kurahashi et al, and published from Softbank Creative on Jan. 15, 2006.

Methods 1 to 3 respectively correspond to "3.6.3 Table per subclass", "3.6.1 Table per concrete class", and "3.6.2 Table per class hierarchy" of the article described above.

In general, according to the class structure (logical data structure) of objects to be mapped, shared items are designated as attributes of a main class and inherent items of each organization are designated as attributes of a subclass for each organization. FIG. 24 shows an example of the class structure for the data items of FIG. 2. The main class having a shared item as an attribute is associated with an in-house shared corporate attribute 2401, and the subclass having an inherent item as an attribute is associated with a sales division inherent corporate attribute 2402 and a supply division inherent corporate attribute 2403. The sales division inherent corporate attribute 2402 has, as attributes, inherent items to be used by the sales division. The supply division inherent corporate attribute 2403 has, as attributes, inherent items to be used by the supply division.

Description will be given of FIGS. 25 to 21 based on the above assumption. In FIG. 25, shared items are stored in an in-house shared table 2501, inherent items to be used by the sales division are stored in the sales division inherent table 2502, and inherent items to be used by the supply division are stored in the supply division inherent table 2503.

In FIG. 26, shared items 2602 and inherent items to be used by the sales division are stored in a sales division inherent table 2601, and shared items 2612 and inherent items to be used by the supply division are stored in the supply division inherent table 2611.

In FIG. 27, a shared item 2711, a sales division inherent item 2712, and a supply division inherent item 2713 are stored in one in-house shared table 2701.

SUMMARY OF THE INVENTION

The above conventional methods (methods 1 to 3) are accompanied by a problem in which a change in an organization (e.g., an addition of a new organization) affects business applications of other organizations and operation of the data processing system.

For example, in methods 1 and 2, when an organization is added, it is required to add a table to store inherent items. This hence affects operation of the data processing system. This is because batch processing and an operation job procedure are to be changed to secure backup of data.

In addition, there also exists a problem of methods 1 and 2 in which when an inherent item is changed (addition, deletion, or change in its contents), it is required to suspend transactions of all business applications of the associated organization. This is because the addition of an inherent item requires a change in structure of each table which stores inherent items to be used by the business applications of the organization.

In method 3, to change an inherent item of an organization, it is required to suspend all transactions of business applications of all organizations, which affects the other organizations. This is because when an inherent item is changed, it is required to change a single table to be used by business applications of all organizations.

Additionally, in method 3, the number of columns of a table is the sum of the shared items and the inherent items of all organizations and hence is likely to become too large. Therefore, the number possibly reaches the upper limit of the number of columns allowed by RDBMS depending on cases. After this point, it is not possible for any organization to add any inherent item.

The present invention has been devised in consideration of the above problems and it is an object the present invention to mitigate, when an organization changes an inherent item for use thereof in a data processing system, influence to be exerted upon the other organizations and the operation of the data processing system.

To achieve the above object according to the present invention, there is provided a data processing apparatus including an RDBMS storing information shared among a plurality of organizations for use in a data processing system including the data processing apparatus and a business application execution apparatus which is employed when either one of the organizations uses the information stored in the RDBMS of the data processing apparatus and which is communicably connected to the data processing apparatus.

The information is identified by an Identification (ID) and includes a plurality of data items.

The data processing apparatus stores, in the RDBMS, shared item information for storing the ID and a shared item value as a value of a shared item which is a data item shared among the plural organizations and inherent item information for storing the ID, an organization name as a name of the organization, an inherent item name as a name of an inherent item which is a data item to be referred to and to be updated by an organization corresponding to the organization name, and an inherent item value as a value of the inherent item. The data processing apparatus includes a table virtualizing section for outputting; based on an input from the business application execution apparatus, the input including an output item name including the shared items and the inherent items designated without discrimination therebetween, a search conditional expression including the shared items and the inherent items without discrimination therebetween, and the organization name; a record including the shared items and the inherent items without discrimination therebetween to the business application execution apparatus.

The table virtualizing section includes an item type judge processing section for judging an item type to determine whether each of the output item name thus inputted and the data item included in the search conditional expression is a shared item or an inherent item by referring to the shared item information, an inherent item referring conversion processing section for creating, for the data item judged as an inherent item by the item type judge processing section, an inherent item search conditional expression to search the inherent item information for a part thereof associated with an organization name and an inherent item name matching the organization name thus inputted and an inherent item name of the data item judged as an inherent item; a shared item referring conversion processing section for creating, based on the search conditional expression thus inputted, a shared item search conditional expression including only data items judged as shared items by the item type judge processing section, and a record output processing section for concatenating, based on the output item name, a record obtained from the shared item information by use of the shared item search conditional expression to an inherent item value which has an ID substantially equal to an ID of the record and which is obtained from the inherent item information by use of the inherent item search conditional expression to produce a concatenated result, and outputting therefrom the concatenated result as a record including the shared items and the inherent items.

According to the present invention, when an organization changes an inherent item for use thereof, it is possible to reduce influence to be exerted upon the other organizations and the operation of the data processing system.

Other objects, features and advantages of the invention will become apparent from the following description of the embodiments of the invention taken in conjunction with the accompanying drawings.

BRIEF DESCRIPTION OF THE DRAWINGS

FIG. 4 is a diagram showing examples of a shared item table and an inherent item table managing table.

FIG. 5 is a diagram showing an example of an inherent item table.

FIG. 6 is a diagram showing examples of an item table and a virtual row which are used in the processing of a referring processing section.

FIG. 19 is a diagram showing an example of an inherent item managing table.

FIG. 22 is a diagram showing examples of an SQL statement produced from view table definition creating processing and its configuration.

FIG. 23 is a diagram showing examples of an SQL statement produced from view table definition creating processing and its configuration.

FIG. 26 is a diagram showing an example of a table layout when a table is allocated to each concrete class.

FIG. 27 is a diagram showing an example of a table layout when a table is allocated to each class hierarchy.

DESCRIPTION OF THE EMBODIMENTS

Figure 1:
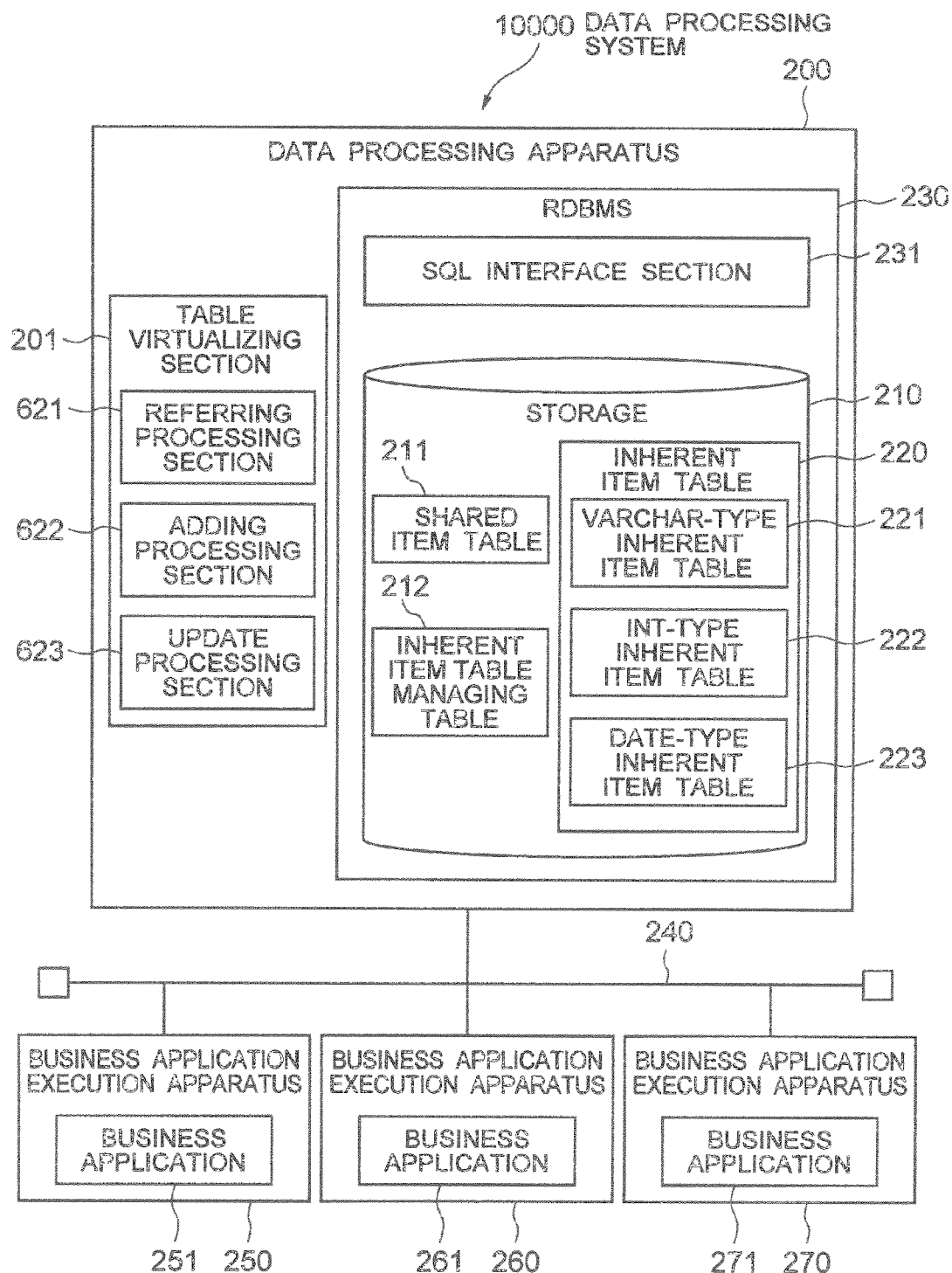
FIG. 1 is a block diagram showing a configuration of a first embodiment of a data processing system.
Figure 2:
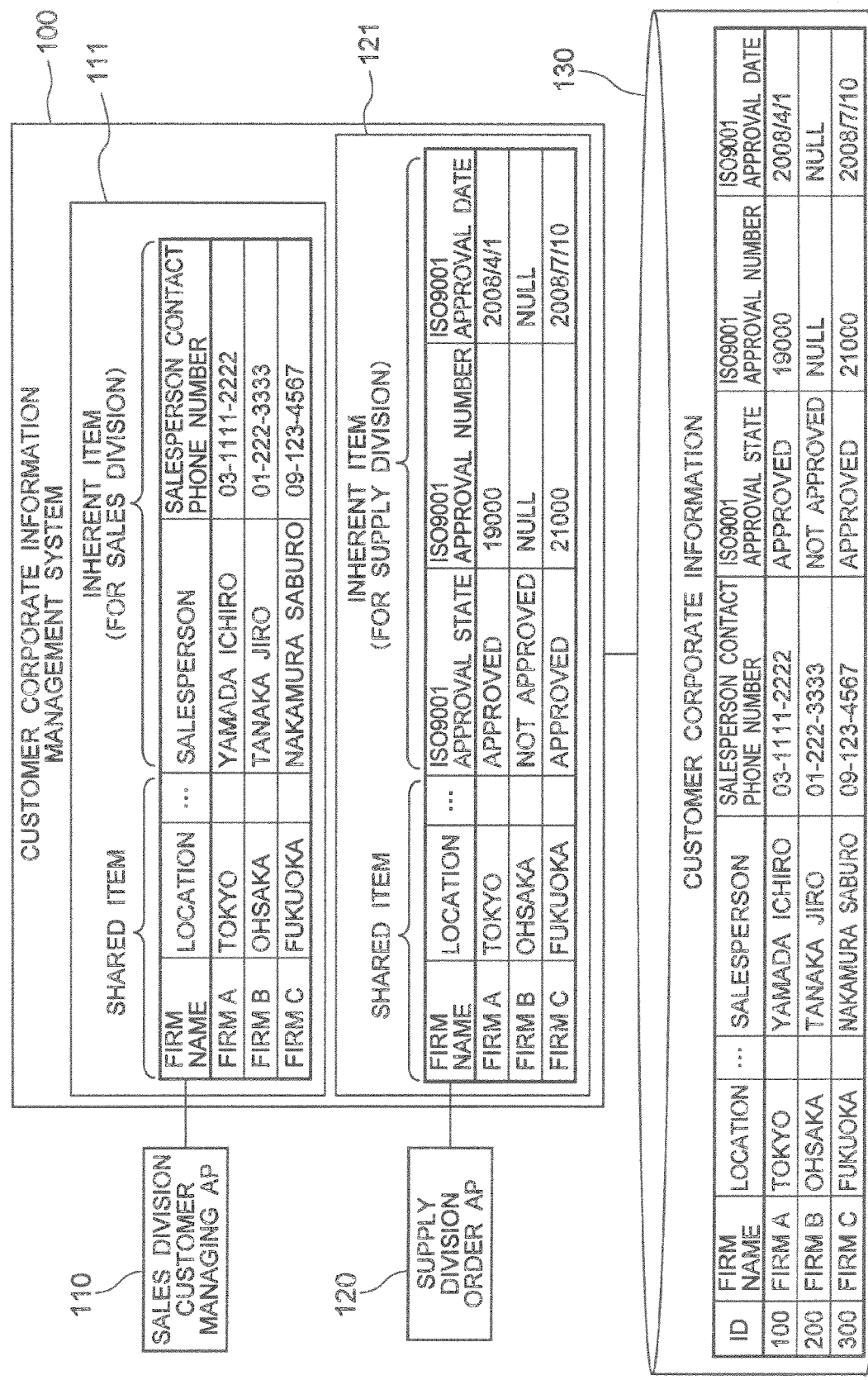
FIG. 2 is an explanatory diagram including a customer corporate information managing system.

Description will now be given of embodiments of the present invention by referring to the drawings (also other drawings according to necessity).

First Embodiment

As FIG. 1 shows, a data processing system 10000 in a first embodiment includes a data processing apparatus 200 and business application execution apparatuses 250, 260, and 270. These constituent components are mutually connected via a network 240.

The apparatuses 250, 260, and 270 respectively include business applications 251, 261, and 271 which are application programs to refer to or to update data in the data processing apparatus 200.

The data processing apparatus 200 includes an RDBMS 230 which manages data to be referred to or to be updated by the business applications 251, 261, and 271 and a table virtualizing section 201 which provides the applications 251, 261, and 271 with a function to refer to or to update data in a virtual table including mutually different inherent items for the respective organizations.

The RDBMS 230 includes a Structured Query Language (SQL) interface section 231 and a storage 210. The SQL interface section 231 provides the applications 251, 261, and 271 with SQL as an interface to refer to or to update data. As functions to connect to the SQL interface section 231, there have been broadly employed Open Database Connectivity (ODBC) and JDBC (an interface to access a database from a Java (registered trademark) program). The table virtualizing section 201 may use the SQL interface section 231 to access a table in the storage 210.

The storage 210 includes a shared item table (shared item information) 211 to store values of shared items shared among a plurality of organizations, an inherent item table (inherent item information) 220 which stores values of inherent items inherent to an organization and which includes mutually different tables for respective types of values of the inherent items, and an inherent item table managing table (inherent item information managing information) 212 to store a relationship between the inherent item table and types.

A VARCHAR-type inherent item table 221 stores values of inherent items of VARCHAR type (variable-length character string type). An INT-type inherent item table 222 and a DATE-type inherent item table 223 respectively store values of inherent items of INT type (numeric type) and DATE type (date type). An inherent item table of any other type may also be included.

Figure 3:
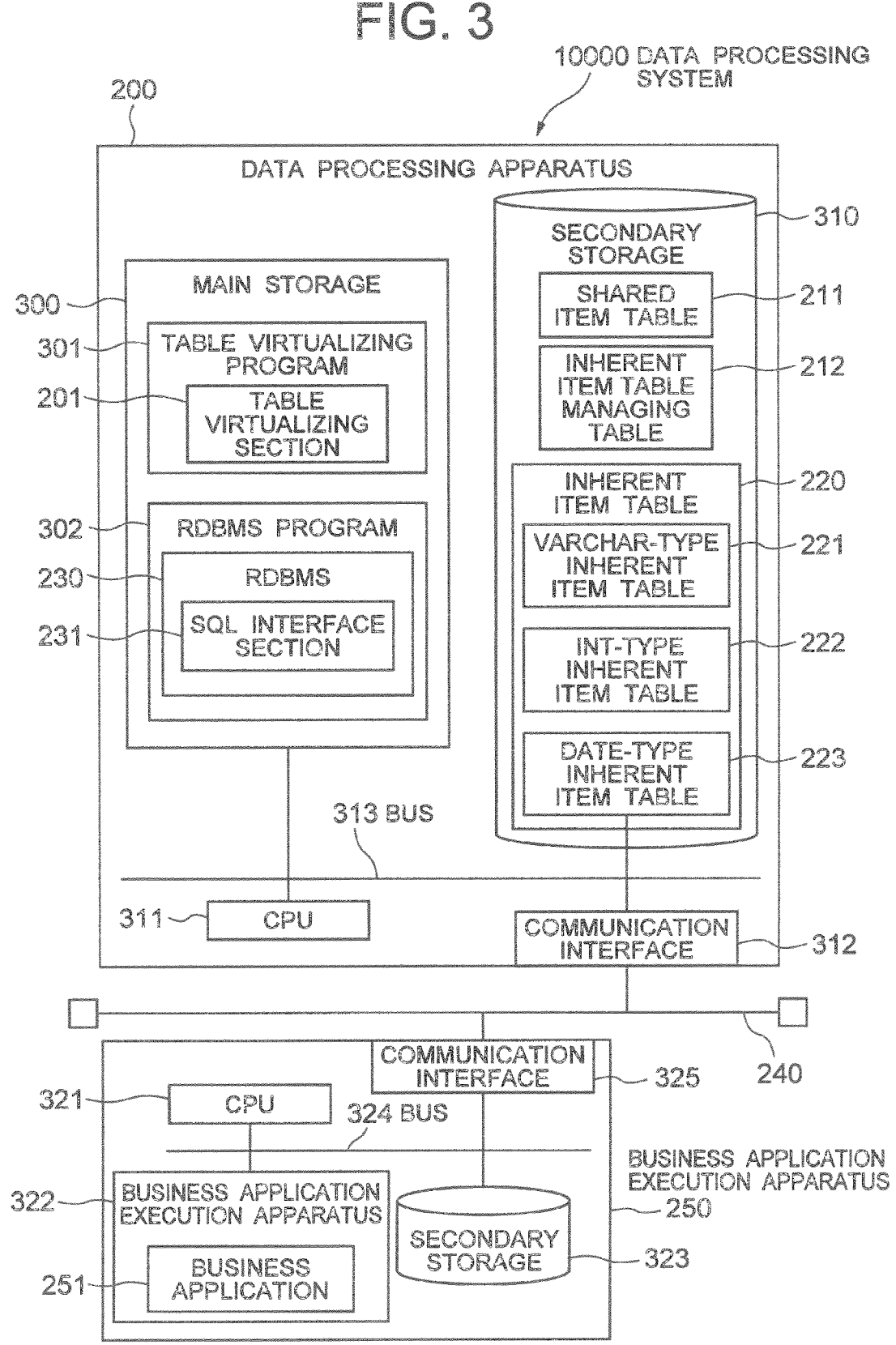
FIG. 3 is a block diagram showing a configuration of a data processing system including hardware.

Next, description will be given of a hardware configuration of the data processing system 10000. As shown in FIG. 3 (since the business application execution apparatuses 250, 260, and 270 are substantially equal in the hardware configuration, only the application execution apparatus 250 is representatively shown), the data processing apparatus 200 includes a Central Processing Unit (CPU) 311, a main storage 300, a secondary storage 310, and a communication interface 312. These components are connected via a bus 313 to each other.

The main storage 300 includes a table virtualizing program 301 and an RDBMS program 302 which are to be executed by the CPU 311. The table virtualizing program 301 includes a table virtualizing section 201. The RDBMS program 302 includes an RDBMS 230 including an SQL interface section 231.

The secondary storage 310 corresponds to the storage 210 of FIG. 1.

The communication interface 312 is a module to connect to the network 240.

The business application execution apparatus 250 includes a CPU 321, a main storage 322, a secondary storage 323, and a communication interface 325, which are mutually connected via a bus 324.

The main storage 322 stores the business application 251 to be executed by the CPU 321. The communication interface 325 is a module to connect to the network 240.

Figure 28:
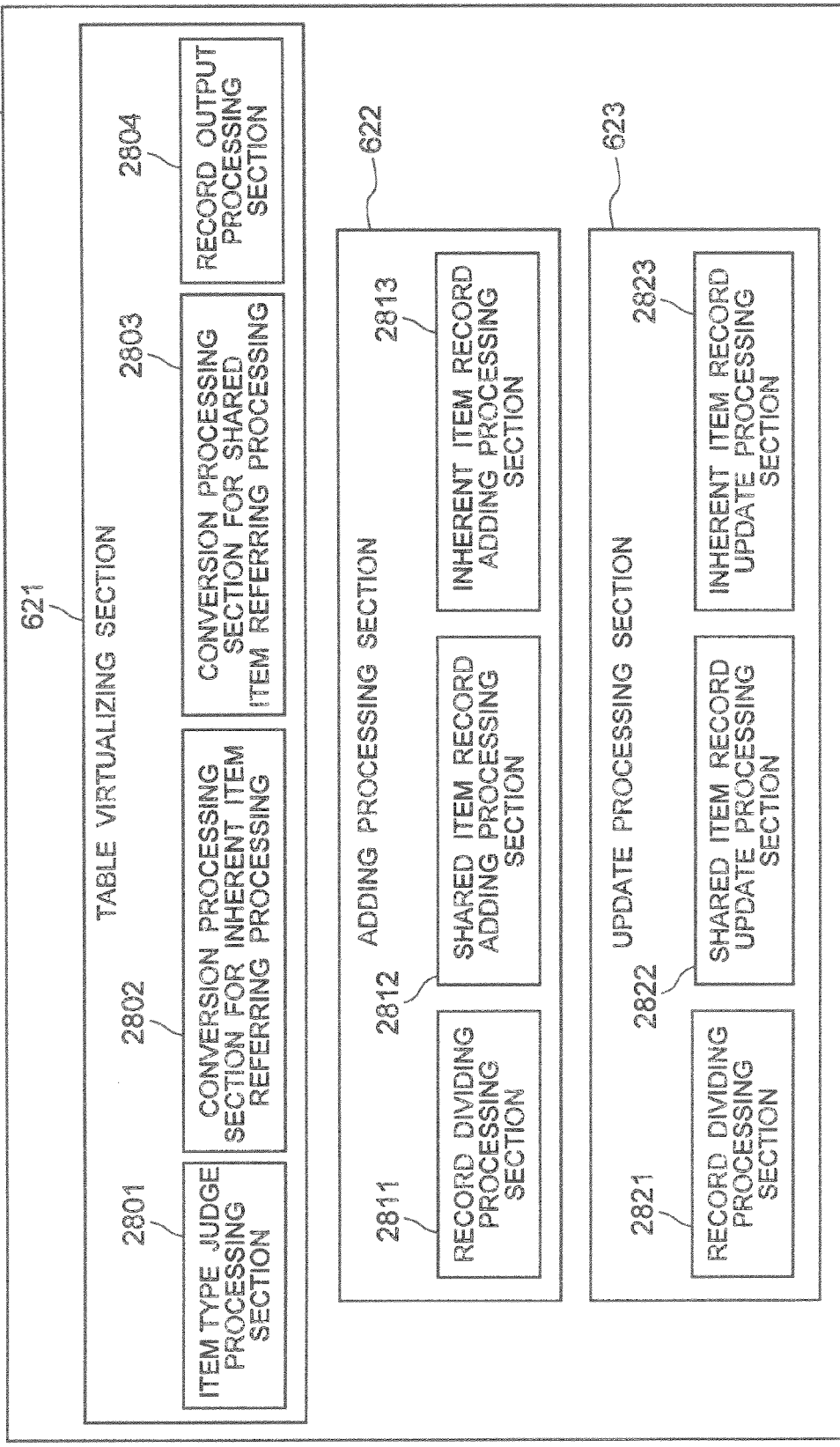
FIG. 28 is a diagram showing a configuration of a table virtualizing section.

Referring now to FIG. 28, description will be given of the table virtualizing section 201. As FIG. 28 shows, the table virtualizing section 201 includes a referring processing section 621, an adding processing section 622, and an update processing section 623.

The referring processing section 621 includes an item type judge processing section 2801, a conversion processing section of inherent item referring processing 2802, a conversion processing section of shared item referring processing 2803, and a record output processing section 2804. Details of these sections will be described later.

The adding processing section 622 includes a record division or dividing processing section 2811, a shared item record adding processing section 2812, and an inherent item record adding processing section 2813, which will be described later in detail.

Next, referring to FIG. 4, description will be given of the shared item table 211 and the inherent item table managing table 212. As FIG. 4 shows, the shared item table 211 includes an Identification (ID) 401 to identify a record and shared items shared among a plurality of organizations. In the example of FIG. 4, the shared items are a firm name 402, a firm location 403, and a firm representative 404.

The inherent item table managing table 212 includes a type 411 indicating a type of an inherent item value stored in the inherent item table 220 and an inherent item table name (inherent item information name) 412 indicating a name of inherent item table name.

Referring to FIG. 5, description will be given of the inherent item table 220. As FIG. 5 shows, the VARCHAR-type inherent item table 221 includes an ID 501, a using organization (organization name) 502, an item name (inherent item name) 503, and an item value (inherent item value) 504. The ID 501 is an identifier to identify a record and stores the same identifier as the ID 401 of the shared item table 211 (FIG. 4). The using organization 502 stores an organization name indicating an organization which uses the inherent item. The item name 503 stores a name of the inherent item. The item value 504 stores a value of the inherent item.

The INT-type and DATA-type inherent item tables 222 and 223 differ from the VARCHAR-type inherent item table 221 only in the type of the item value 504. Hence, description of the tables 222 and 223 will be avoided.

Referring to FIG. 6, description will be given of an item list table 600 and a virtual row 610 employed in the processing of the referring processing section 621. The item list table 600 is used to store information regarding items inputted in the processing of the referring processing section 621.

As FIG. 6 shows, the item list table 600 includes an item name 601, an item type 602, and an inherent item search conditional expression 603. The item name 601 indicates a name of an item. The item type 602 indicates whether the item is a shared item or an inherent item. The inherent item search conditional expression 603 is used, when the item is an inherent item, to search the inherent item table 220 for a value of the inherent item.

The virtual row 610 is used in the processing of the referring processing section 621 to create a record to be outputted. In the virtual row 610, an associated column varies according to the contents of a list of output item names inputted from the business application 251. FIG. 6 shows an example of the virtual row 610. The input ID 611 is always present. However, the firm name 612, the location 613, the salesperson 614, and the salesperson contact phone number 615 are only an example. These items exist only when associated items are specified in the list of output item names.

The item list table 600 and the virtual row 610 are temporarily stored in the main storage 300 (FIG. 3) when the referring processing section 621 executes its processing. After the processing is finished, these items 600 and 610 are deleted from the main storage 300.

Next, referring to FIGS. 7 to 17, description will be given of a flow of processing in the table virtualizing section 201.

The referring processing section 621, the adding processing section 622, and the update processing section 623 are executed in response to requests from the business applications 251, 261, and 271. The referring processing section 621 is executed to refer to data including a shared or inherent item. The adding processing section 622 is executed to add such data, and the update processing section 623 is executed to update the data.

Figure 7:
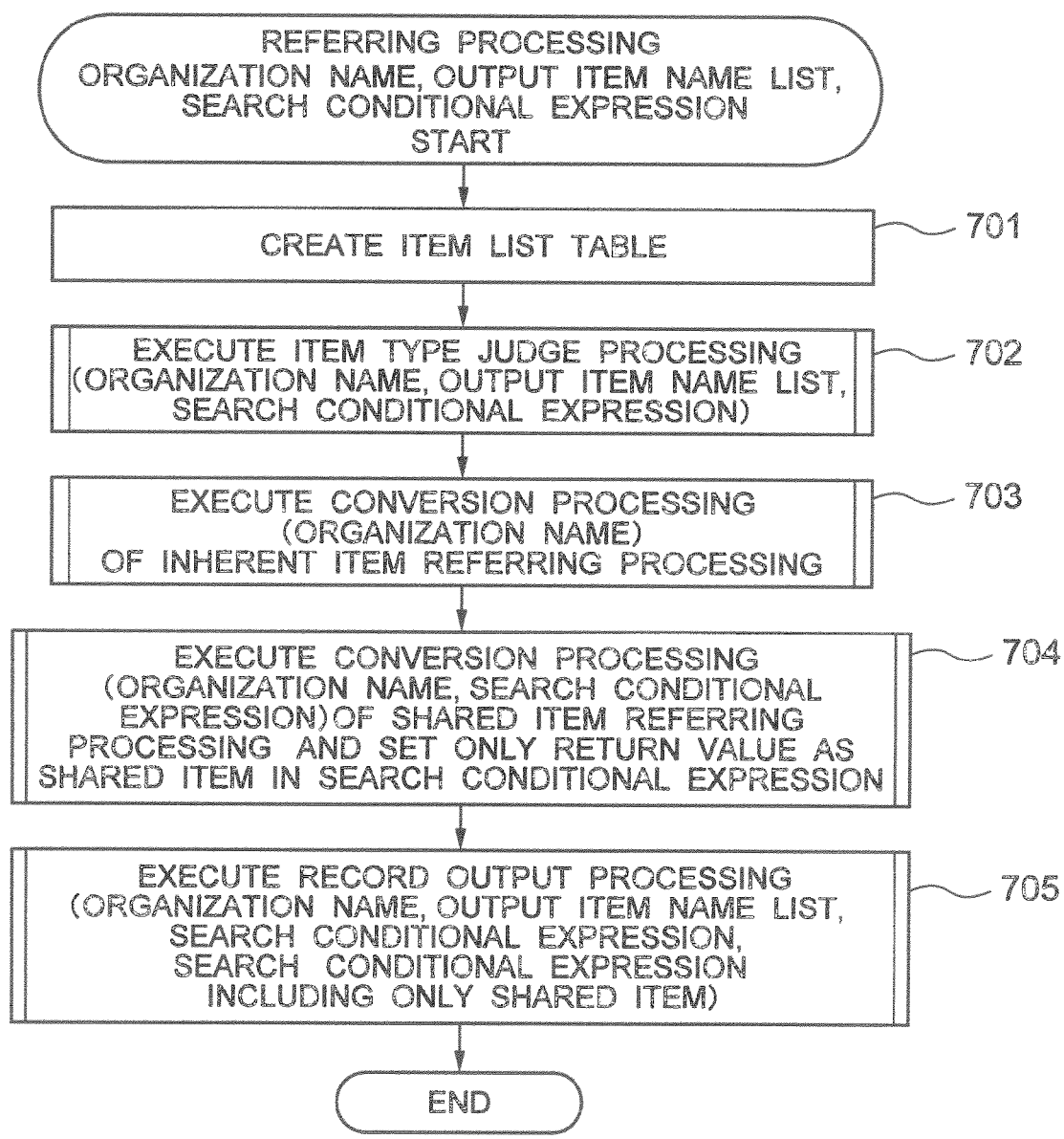
FIG. 7 is a flowchart showing a flow of the referring processing of the referring processing section.

Referring now to FIG. 7, description will be given of the referring processing in the referring processing section 621. An organization name, a list of output item names, and a search conditional expression are inputted for the referring processing. The organization name indicates a name of an organization which uses data. The output item name list is a list of item names to be referred to. The search conditional expression indicates a condition to identify a record to be referred to. These terms also apply to the other diagrams and drawings.

As FIG. 7 shows, in the referring processing, an item list table 600 is first created in the main storage 300 (FIG. 3, step 701).

Next, judge processing is executed to judge an item type (step 702). For the processing, an organization name, an output item name list, and a search conditional expression are designated as arguments. This step 702 (item type judge processing) will be described later in detail.

Next, conversion processing of the inherent item referring processing is executed with the organization name set as an argument (step 703). This step 703 (conversion processing of the inherent item referring processing) will be described later in detail.

Thereafter, conversion processing of the shared item referring processing is executed to receive a return value to create a search conditional expression including only the return value as the shared item (step 704). For the processing, an organization name and a search conditional expression are designated as arguments. This step 704 (conversion processing of the shared item referring processing) will be described later in detail.

Finally, the record output processing is executed (step 705). For the processing, the organization name, the output item name list, the search conditional expression, and the search conditional expression including only the return value as the shared item are designated as arguments. This step 705 (record output processing) will be described later in detail.

Figure 8:
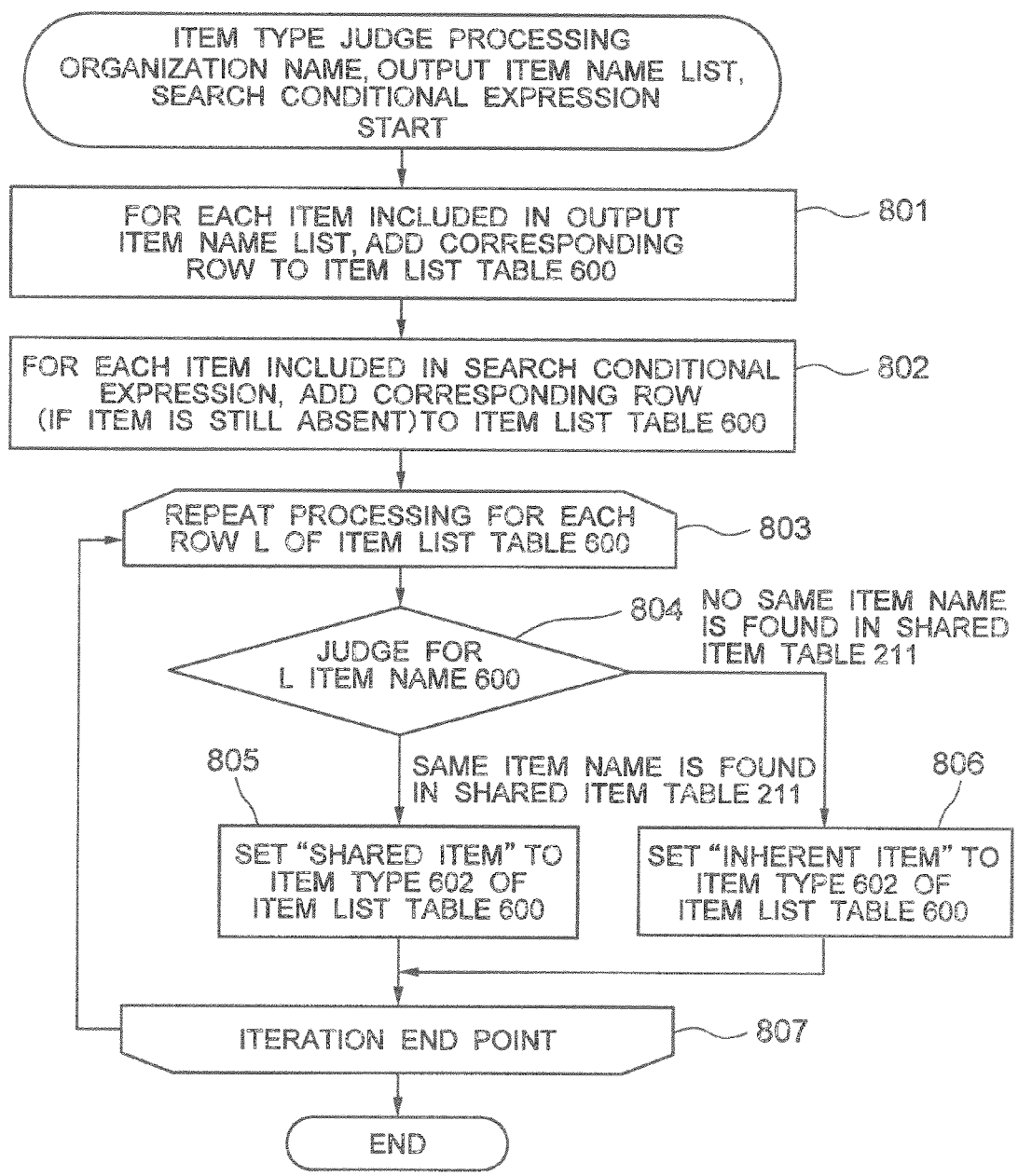
FIG. 8 is a flowchart showing a flow of item type judge processing.

Referring to FIG. 8, description will be given of a flow of the item type judge processing. This processing is executed by the item type judge processing section 2801 (FIG. 28). For the processing, an organization name, an output item name list, and a search conditional expression are inputted.

As FIG. 8 shows, in the item type judge processing, for each item included in the output item name list, a row to which the name of the item is set to the item name 601 (FIG. 6) is added to the item list table 600 (step 801). In this situation, the item type 602 and the inherent item search conditional expression 603 are empty in the row.

Next, for each item included in the search conditional expression, if a row having the name of the item in the item name 601 is not existing in the item list table 600, a row to which the name is set to the item name 601 is added to the item list table 600 (step 802).

For each row L of the item list table 600, the procedure from step 804 to step 806 is repeatedly carried out (steps 803 to 807).

For item name 601 of row L, a check is made to determine whether or not the shared item table 211 (FIG. 4) includes an item of the same item name (step 804). If there exists an item having the same name, control goes to step 805; otherwise, control goes to step 806.

In step 805, "shared item" is set to the item type 602 of the item list table 600. In step 806, "inherent item" is set to the item type 602 of the item list table 600.

Figure 9:
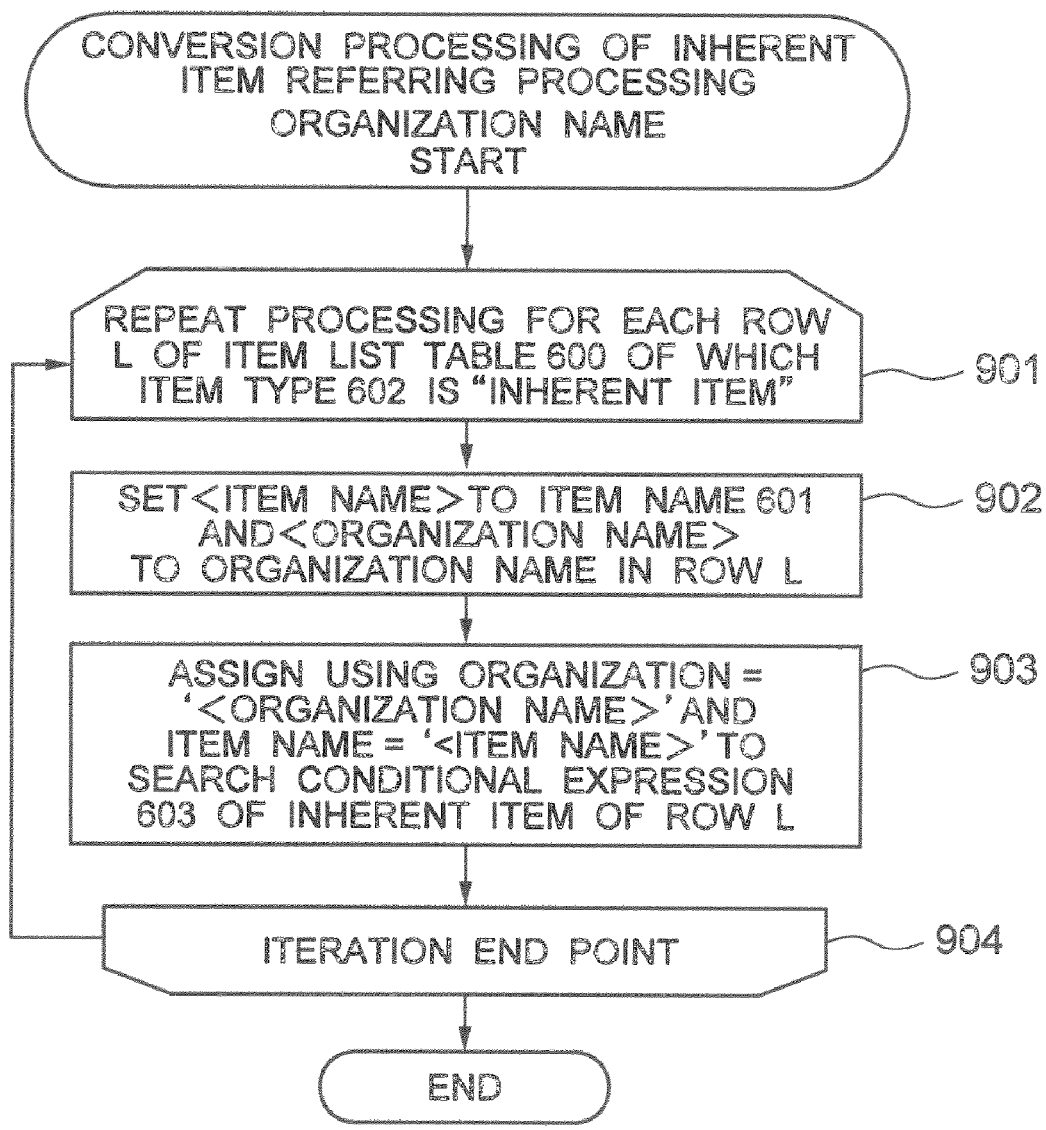
FIG. 9 is a flowchart showing a flow of conversion in inherent item referring processing.

Referring now to FIG. 9, description will be given of a flow of the conversion processing in the inherent item referring processing. This processing is executed by the conversion processing section of inherent item referring processing 2802 (FIG. 28).

As FIG. 9 shows, in the conversion processing, for each row L of the item list table 600 of which the item type 602 is "inherent item", processing of steps 902 and 903 is repeatedly executed (steps 901 to 904).

The item name 601 of the row L is then set as <item name> and the organization name is set as <organization name> (step 902).

Also, "using organization='<organization name>' AND item name='<item name>'" is assigned to the inherent item search conditional expression 603 of the row L (step 903).

Figure 10:
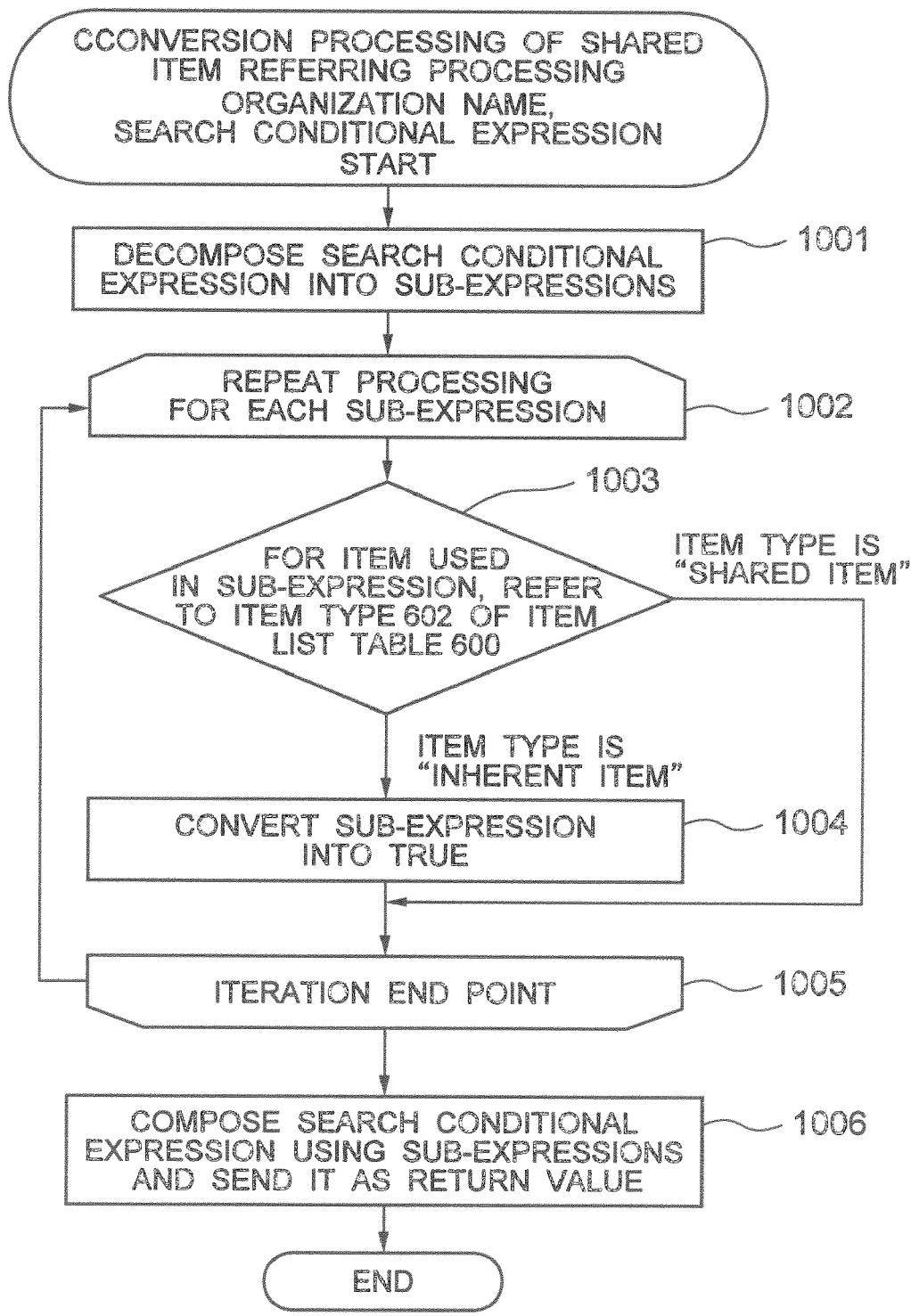
FIG. 10 is a flowchart showing a flow of conversion in share item referring processing.
Figure 11:
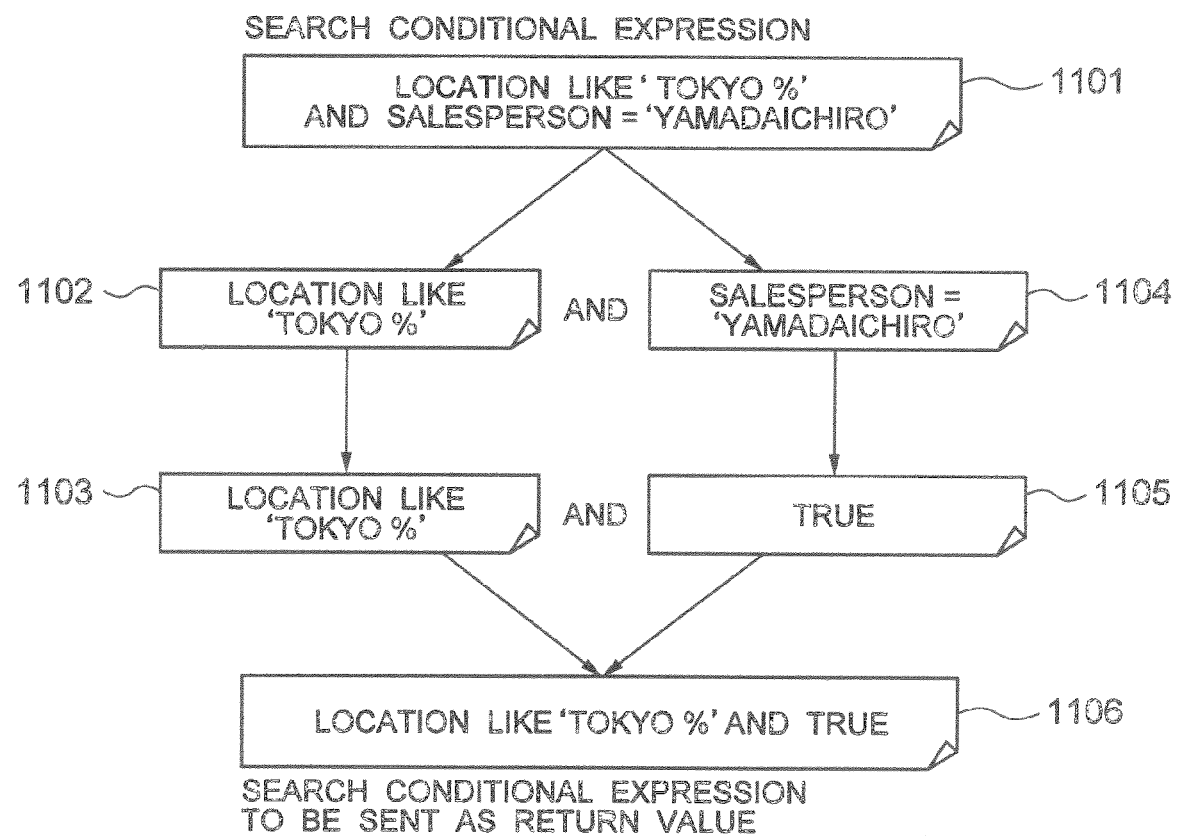
FIG. 11 is a diagram showing an example when a search conditional expression is executed in conversion of shared item referring processing when the contents of the item table are as shown in FIG. 6.

Referring to FIG. 10 and FIG. 11 prepared on the assumption of information piece examples of FIG. 6, description will be given of the conversion processing of shared item referring processing. The conversion processing is executed by the conversion processing section of shared item referring processing 2603 (FIG. 28). An organization names and a search conditional expression are inputted for the processing.

As FIG. 10 shows, in the conversion processing of shared item referring processing, the search conditional expression is decomposed or divided into sub-expressions (step 1001). The sub-expressions are expressions constituting the search conditional expression. Each sub-expression takes a truth value or a false value when the expression is evaluated. Typically, the sub-expression is an equation including an item and a constant (salesperson='Yamada Ichiro') or a predicate (location LIKE 'Tokyo %'). These components are concatenated by AND or OR to each other into a search conditional expression. For example, expressions 1102 and 1104 of FIG. 11 are sub-expressions attained by decomposing a search conditional expression 1101.

For each sub-expression attained in step 1001, processing of steps 1003 and 1004 is repeatedly executed (steps 1002 to 1005).

In step 1003, for an item included in the sub-expression, the item type 602 of the item list table 600 is referred to. If there exists at least one item for which the item type 602 is "inherent item", step 1004 is executed for the item of "inherent item". Otherwise, for example, if the item type 602 is "shared item" for all items, control goes to step 1005 to repeatedly execute the processing beginning at step 1002.

In step 1004, the sub-expression is converted into 'TRUE'.

The sub-expression 1102 of FIG. 11 includes "location" as an item. However, since the item type 602 associated with the item is "shared item" in the item list table 600, the sub-expression 1102 is not converted into 'TRUE' (sub-expression 1103). The sub-expression 1104 of FIG. 11 includes "salesperson" as an item, and the item type 602 associated with the item is "inherent item" in the item list table 600; hence the sub-expression 1104 is converted into 'TRUE' (sub-expression 1105).

In step 1006, the sub-expressions thus decomposed are collected into one search conditional expression to be sent as a return value. To produce the search conditional expression, the logical operators employed to decompose the expression into sub-expressions in step 1001 are used. For example, FIG. 11 shows an example to compose one search conditional expression using the sub-expressions 1103 and 1105. Since the sub-expressions 1103 and 1105 which are concatenated by AND to each other in search conditional expression 1101 are decomposed in step 1001, a search conditional expression 1106 also employs AND to concatenate the components to each other.

Figure 12:
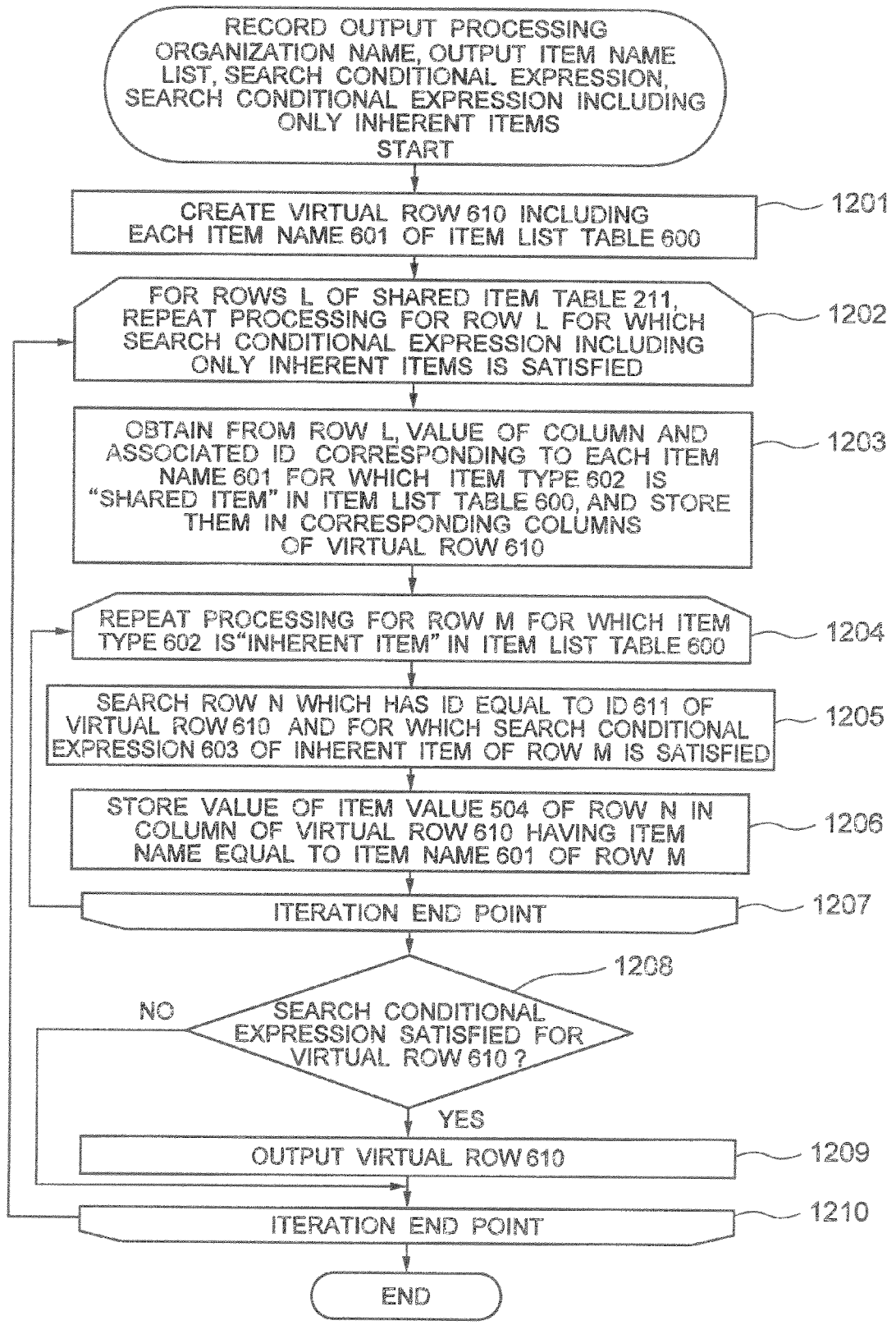
FIG. 12 is a flowchart showing a flow of record output processing.

Referring to FIG. 12, description will be given of the record output processing. This processing is executed by the record output processing section 2804 (FIG. 28) by using as inputs thereto, an organization name, an output item name list, a search conditional expression, and a search conditional express ion including only inherent items.

As FIG. 12 shows, a virtual row 610 (FIG. 6) including the item names 601 of the item list table 600 in its columns is first created in the record output processing (step 1201).

Based on the rows L of the shared item table 211 (FIG. 4), for each row L thereof for which the search conditional expression including only inherent items is satisfied, processing from step 1203 to step 1209 is repeatedly executed (steps 1202 to 1210).

From the row L, a value of a column corresponding to each item name 601 for which the item type 602 is "shared item" in the item list table 600 and an associated ID are obtained to be stored in corresponding columns of the virtual row 610 (stop 1203).

For a row M for which the item type 602 is "inherent item" in the item list table 600, processing from step 1205 to step 1207 is repeatedly executed (step 1204).

A search is made for a row N which has the same ID as the ID 611 of the virtual row 610 and for which the inherent item search conditional expression 603 of the row M is satisfied (step 1205).

Subsequently, the value of the item value 504 of the row N (FIG. 5) is stored in the column of the virtual row 610 having the same name as the item name 601 of the row M (step 1206), if the row N does not exist in step 1205, 'NULL' is stored in the column of the virtual row 610.

Next, a check is made to determine whether the search conditional expression is satisfied for the virtual row 610 (step 1208). If satisfied (yes), step 1209 is executed; otherwise, step 1209 is skipped.

In step 1209, as a record for which the inputted search conditional expression is satisfied, the virtual row 610 is outputted to a business application such as a business application 251 of the business application execution apparatus 250.

Figure 13:
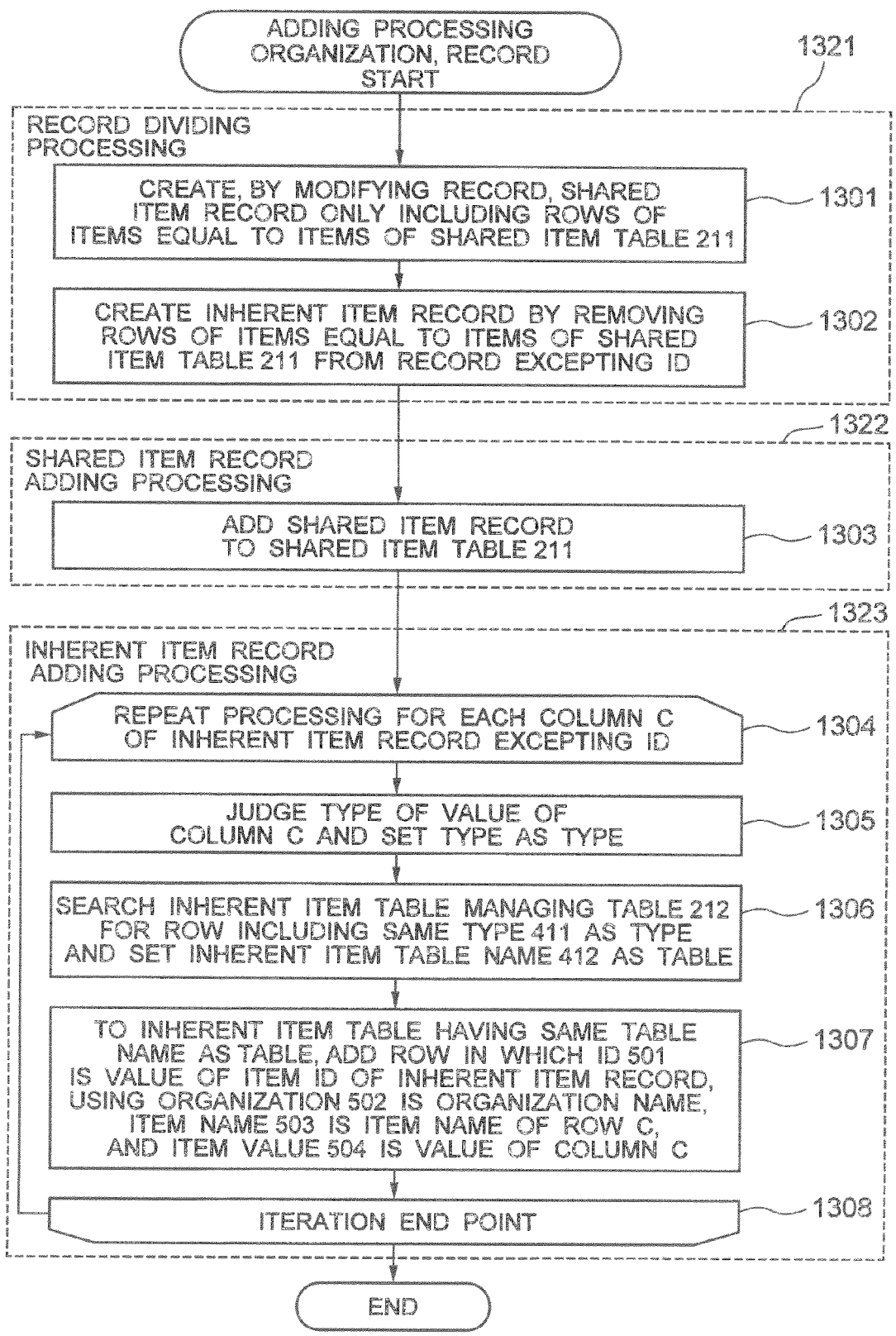
FIG. 13 is a flowchart showing a flow of item adding processing.
Figure 14:
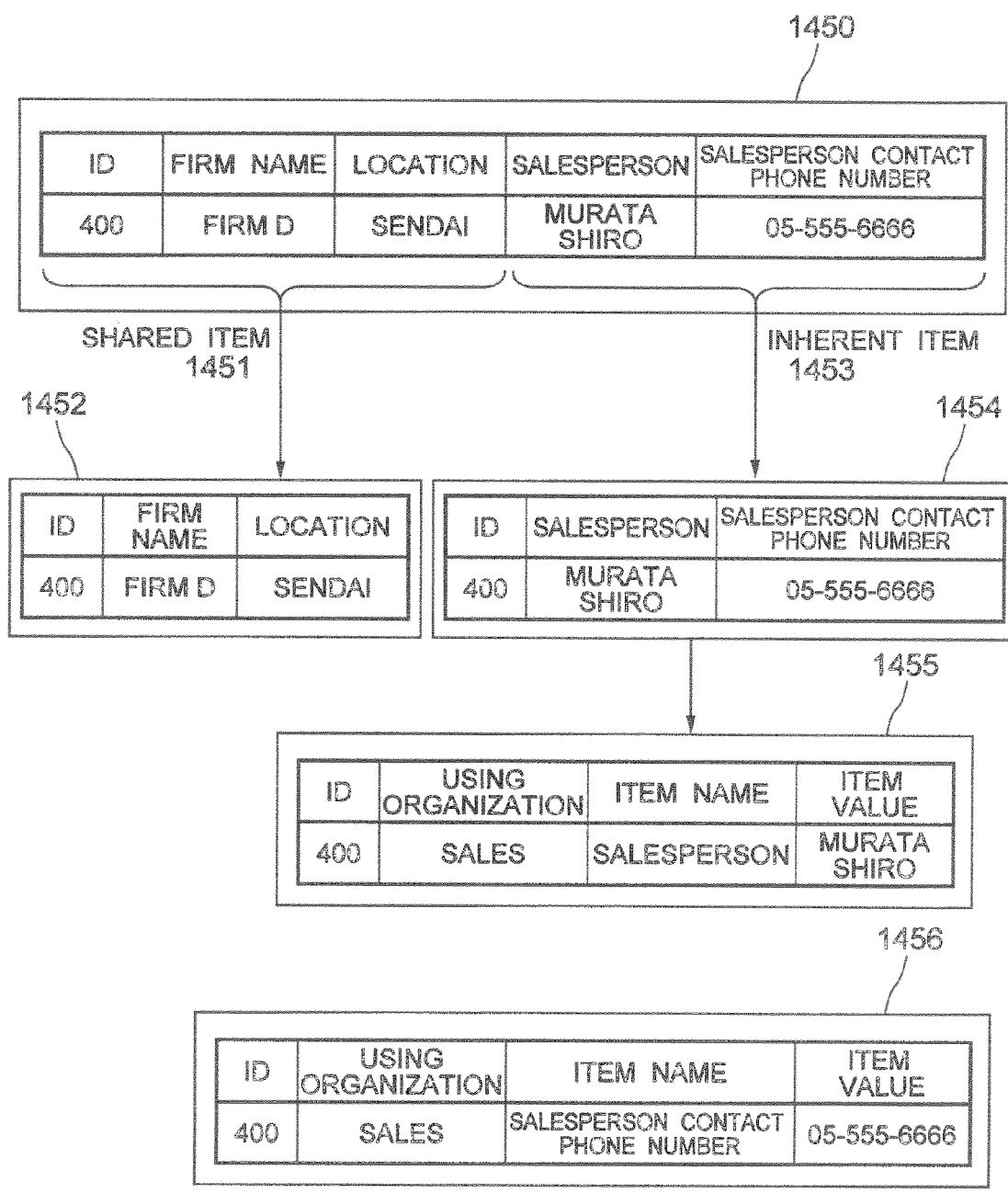
FIG. 14 is a block diagram showing an example of processing to input a record by the adding processing when the contents of the shared item table are as shown in FIG. 4.

Referring to FIG. 13 and FIG. 14 which is prepared on the premise of information examples of FIG. 4, description will be given of a flow of the adding processing. This processing is executed by the adding processing execution section 622 (FIG. 1).

In FIG. 13, processing of steps 1301 and 1302 is record division processing to be executed by the record division processing section 2811 (FIG. 28). Processing 1322 in step 1303 is shared item record adding processing to be executed by the shared item record adding processing execution section 2812 (FIG. 28). Processing 1323 from step 1304 to step 1308 is inherent item record adding processing to be executed by the inherent item record adding processing execution section 2813 (FIG. 28).

The adding processing is executed using an organization name and a record as inputs thereto. The record indicates a record to be added.

In the adding processing, based on the record, a shared item record including only columns having the same items as those of the snared item table 211 is created (FIG. 4). In the example of FIG. 14, based on a record 1450, a shared item record 1452 including only shared items, i.e., the ID, the firm name, and the location (shared item 1451) is created.

Additionally, an inherent item record is created by removing, from the record, columns having the same items as those of the shared item table 211 (the ID is kept remained; step 1302). In the example of FIG. 14, by removing the shared item, i.e., the firm name and the location (shared item 1451), there is created an inherent item record 1454 including columns of the ID, the salesperson, and the salesperson contact phone number.

The shared item record is added to the shared item table 211 (FIG. 4; step 1303).

For each column C of the inherent item record excepting the ID, processing from step 1305 to step 1307 is repeatedly executed (steps 1304 to 1308).

First, the type of the value of the column C is judged to set the type as TYPE (step 1305). Next, the system searches the inherent item table managing table 212 (FIG. 4) for a row having the same type 411 as TYPE and then sets the inherent item table name 412 as TABLE (step 1306).

To an inherent item table in which the table name is TABLE (either one of the VARCHAR-type inherent item table 221, the INT-type inherent item table 222, and the DATE-type inherent item table 223 of FIG. 5), a column in which the ID 501 is the value of the ID of the inherent item record, the using organization 502 is the using organization, the item name 503 is the item name of the column C, and the item value 504 is the value of the column C is added (step 1307). In FIG. 14, a record 1455 is an example of the row to be added if the column C is a salesperson, and a record 1456 is an example of the row to be added if the column C is a salesperson contact phone number.

Figure 15:
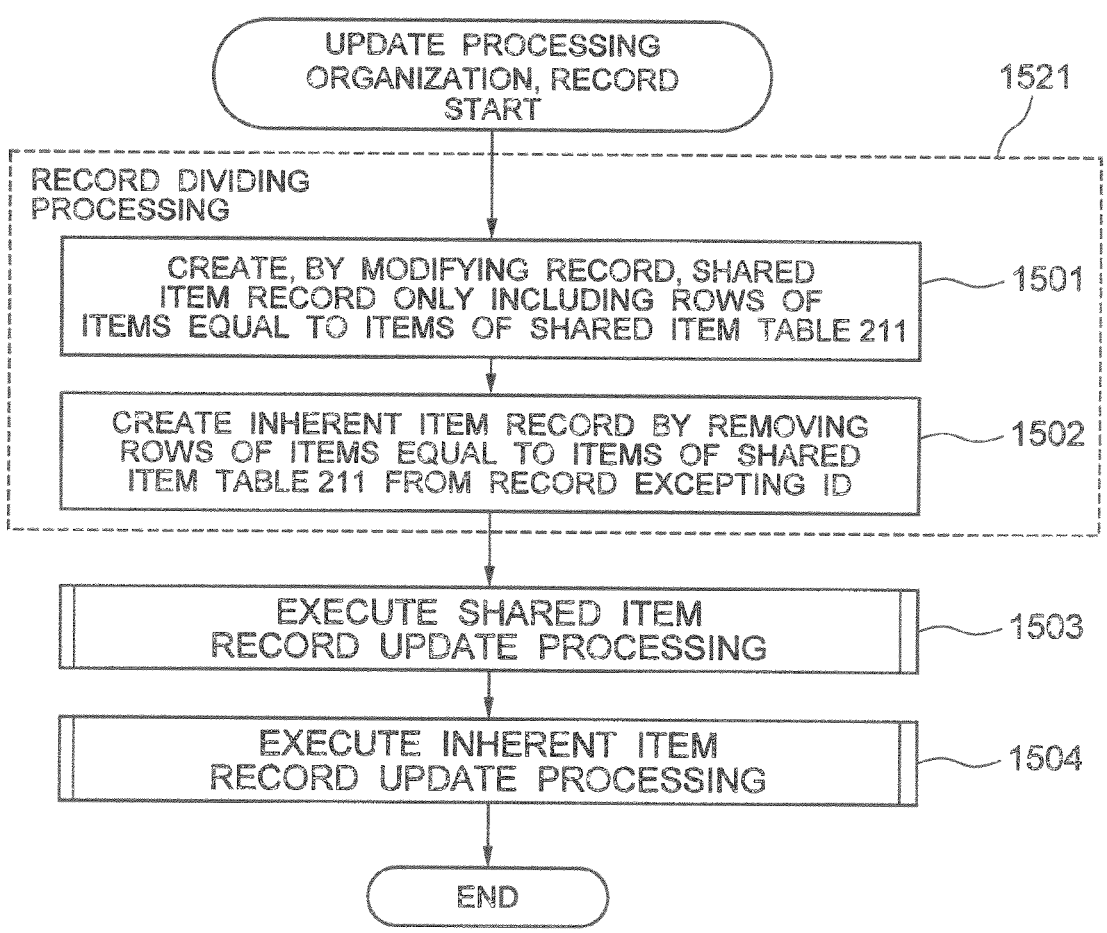
FIG. 15 is a flowchart showing a flow of update processing.

Referring now to FIG. 15, description will be given of the update processing, which is executed by the update processing section 623 (FIG. 1). Processing 1521 of steps 1501 and 1502 of FIG. 15 is executed by the record division processing section 2621 (FIG. 28). An organization name and a record are inputted to the update processing. The record indicates a record to be updated.

In the update processing shown in FIG. 15, based on the record, a shared item record is created, the record including only columns having the same item names as the items of the shared item table 211 (FIG. 4; step 1501 similar to step 1301 of FIG. 13).

Next, an inherent item record is created by removing the same items as the items of the shared item table 211 from the record excepting the ID (step 1502 similar to step 1302 of FIG. 13).

The system executes the shared item record update processing (step 1503; details will be described in conjunction with FIG. 16 later).

Finally, the inherent item record update processing is executed (step 1504; details will described in conjunction with FIG. 17 later).

The shared item record update processing will be described by referring to FIG. 16. This processing is executed by the shared item record update processing section 2822 (FIG. 28) by using an organization name and a shared item record as inputs thereto. It is required that the shared item record includes only shared items.

Figure 16:
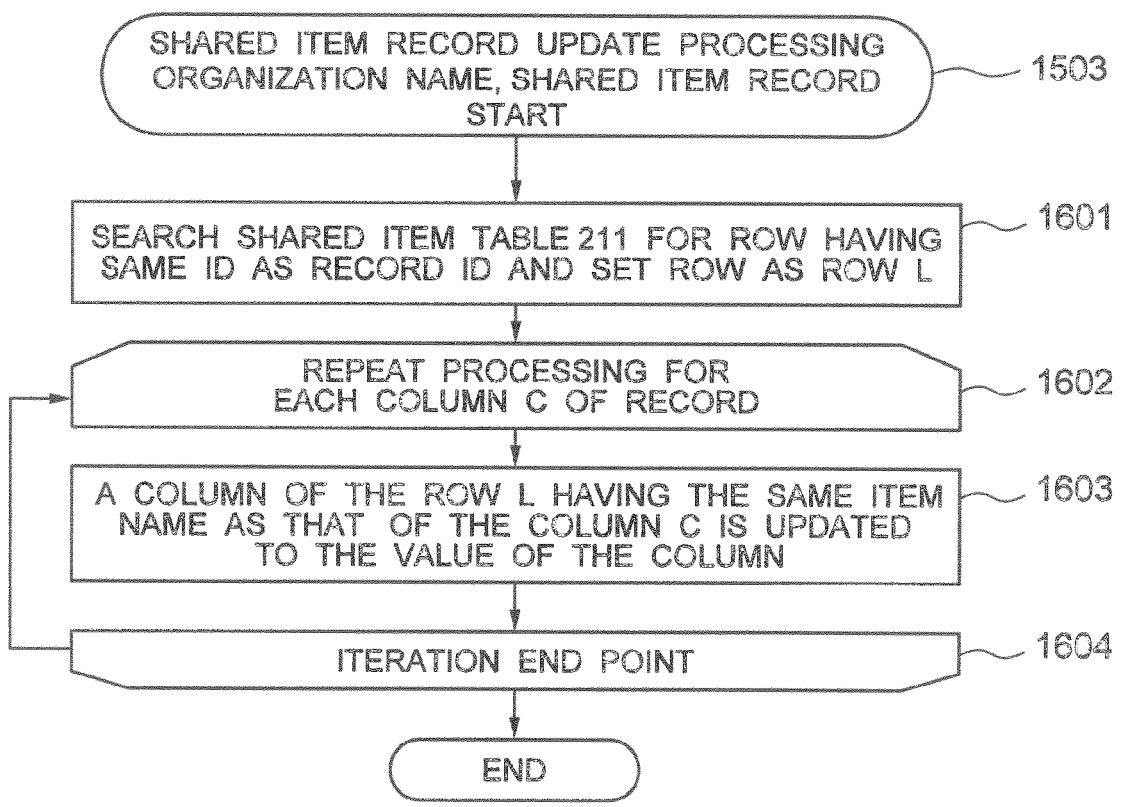
FIG. 16 is a flowchart showing a flow of shared item record update processing.

In this processing, a search is made through the record item table 211 (FIG. 4) for a row including the same ID as that of the pertinent record to set the row as a row L as shown in FIG. 16 (step 1601).

Next, for each column C of the record, processing of step 1603 is repeatedly executed (steps 1602 to 1604).

In step 1603, a column of the row L having the same item name as that of the column C is updated to the value of the column C.

Figure 17:
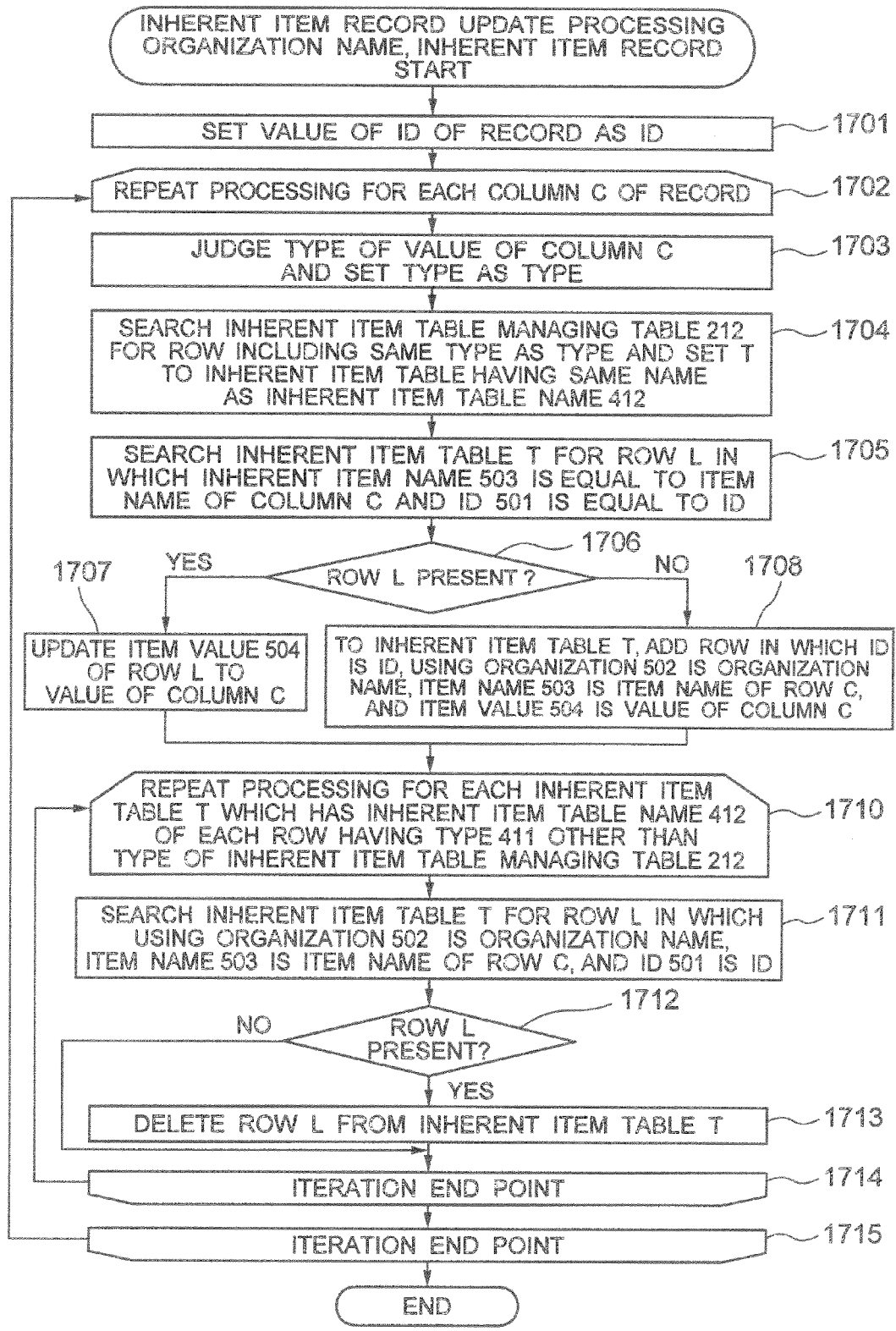
FIG. 17 is a flowchart showing a flow of inherent item record update processing.

Referring to FIG. 17, description will be given of the inherent item record update processing. This processing is executed by the inherent item record update processing section 2823 (FIG. 28) by use of an organization name and an inherent item record as inputs thereto. It is required that the inherent item record includes only inherent items.

As FIG. 17 shows, in inherent item record update processing, the value of the ID of the record is first set as id (step 1701).

For each column C of the record, processing from step 1703 to step 1714 is repeatedly executed (steps 1702 to 1715).

The type of the value of the column C is determined to be set as TYPE (step 1703). A search is made through the inherent item table managing table 212 (FIG. 4) for a row having the same type as TYPE, and then an inherent item table having the same name as that of the inherent item table name 412 of the fable 212 is set as T (step 1704).

A search is made through the inherent item table T (FIG. 5) for a row L in which the organization name 502 is equal to the organization name, the item name 503 is equal to that of the column C, and the ID is equal to id (step 1705). If the row L is present (yes in step 1706), control goes to step 1707; otherwise (no in step 1706), control goes to step 1708.

In step 1707, the item value 504 of the row L is updated to the value of the column C. In step 1708, a row in which the ID 501 is id, the using organization 502 is the organization name, the item name 503 is the item name of the column C, and the item value 504 is the value of the column C is added to the inherent item table T.

For the inherent item table name 412 in each row of the inherent item table managing table 212 for which the type 411 is other than TYPE, processing from step 1711 to step 1713 is repeatedly executed for the inherent item table T having the inherent item table name (steps 1710 to 1714).

A search is made through the inherent item table T for a row L in which the using organization 502 is equal to the organization name, the item name 503 is equal to the item name of the row L, and the ID 501 is id (step 1711).

If the row L is present (yes in step 1712), step 1713 is executed; otherwise (no in step 1712), control goes to step 1713, in step 1713, the row L is deleted from the inherent item table T.

As above, in accordance with the first embodiment of the present invention, each of the business applications 251, 261, and 271 produces an output by use of the referring processing section 621, the adding processing section 622, and the update processing section 623 included in the table virtualizing section 201 to thereby refer to or to update data including shared and inherent items. In the operation, it is not required to take the configurations of the shared item table 211 and the inherent item table 220 into consideration. Further, it is not required to discriminate the shared items from the inherent items. Hence, for a table which includes shared and inherent items and which is dedicated to an organization, data items can be referred to or updated as though the records are referred to or updated.

Addition of an inherent item can be achieved by adding a record including a new inherent item as a column (i.e., by executing the adding processing). In the operation, it is not required to change the structure of any table stored in the storage 210. Hence, even an inherent item is added, the other organizations and the operation of the data processing system are little affected.

Second Embodiment

In the first embodiment of the present invention, the referring processing section 621, the adding processing section 622, and the update processing section 623 included in the table virtualizing section 201 execute the procedure to refer to or update data. In the second embodiment, the view table of RDBMS executes the procedure to refer to or update data.

Figure 18:
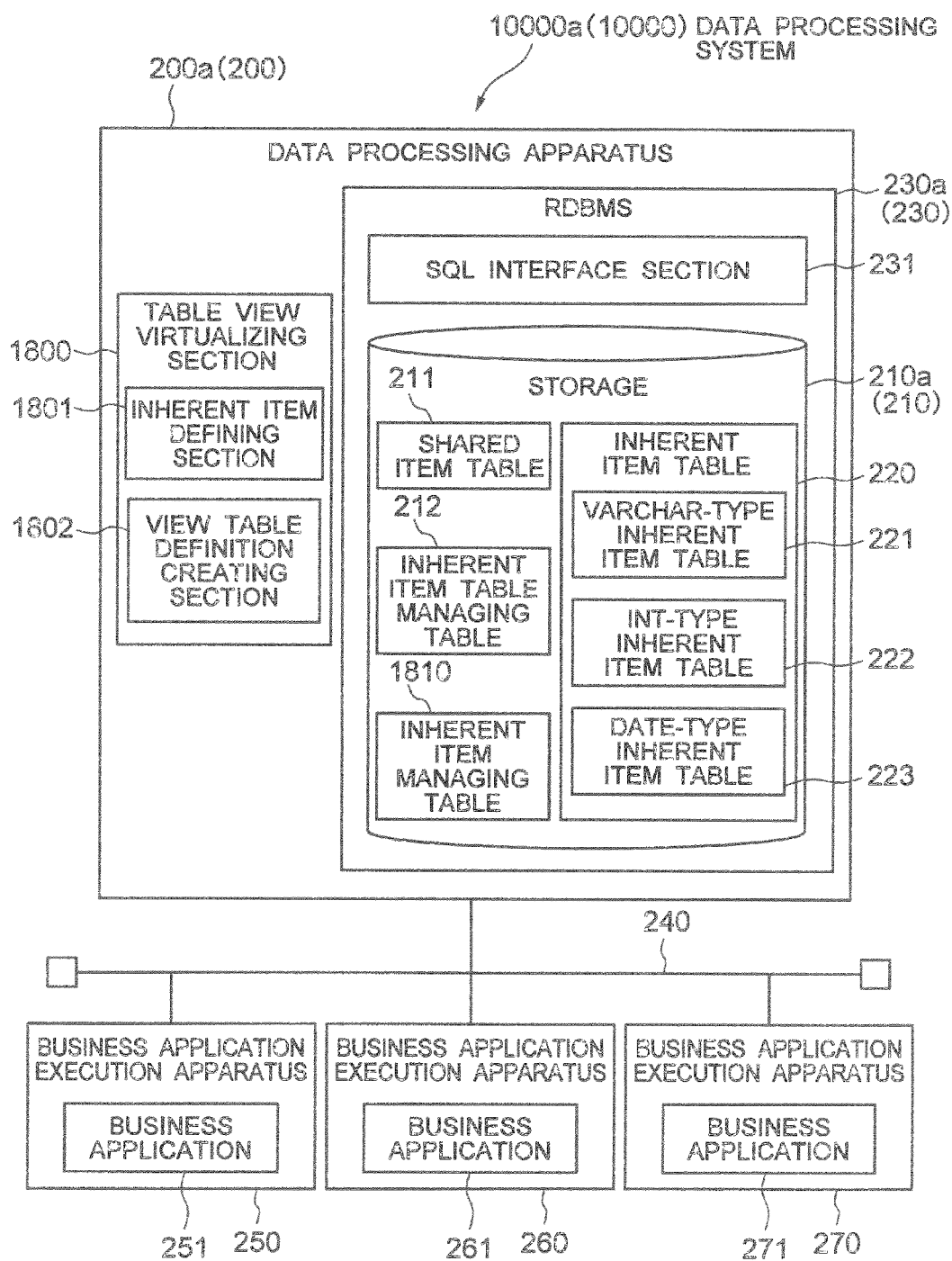
FIG. 18 is a block diagram showing a configuration of a second embodiment of a data processing system.

Referring to FIG. 18, description will be given of structure of a data processing system 10000a (10000) in the second embodiment of the present invention. The same constituent components as those of the data processing system 10000 of the first embodiment will be assigned with the same reference numerals, and description thereof will be given according to necessity.

In a data processing apparatus 200a (200), as compared with the data processing apparatus 200 of the first embodiment, the table virtualizing section 201 is dispensed with, and a table view virtualizing section 1800 and an inherent item managing table 1810 are additionally installed.

The table view virtualizing section 1800 includes an inherent item defining section 1801 to provide a function to define an inherent item and a view table definition creating section 1802 to create a view table definition to refer to or to update data.

The inherent item managing table 1810 includes information regarding the inherent item definition. The table 1810 is updated by the inherent item defining section 1801 and is referred to by the view table definition creating section 1802.

The inherent item managing table 1810 will be described by referring to FIG. 19. The table 1810 includes an organization name 1901, an inherent item name 1902, a type 1903, and an inherent item table name 1904. The organization name indicates an organization which uses the inherent item. The inherent item name 1902 is a name of the inherent item. The type 1903 indicates a type of the inherent item. The inherent item table name 1904 is a name of the inherent item table.

Figure 20:
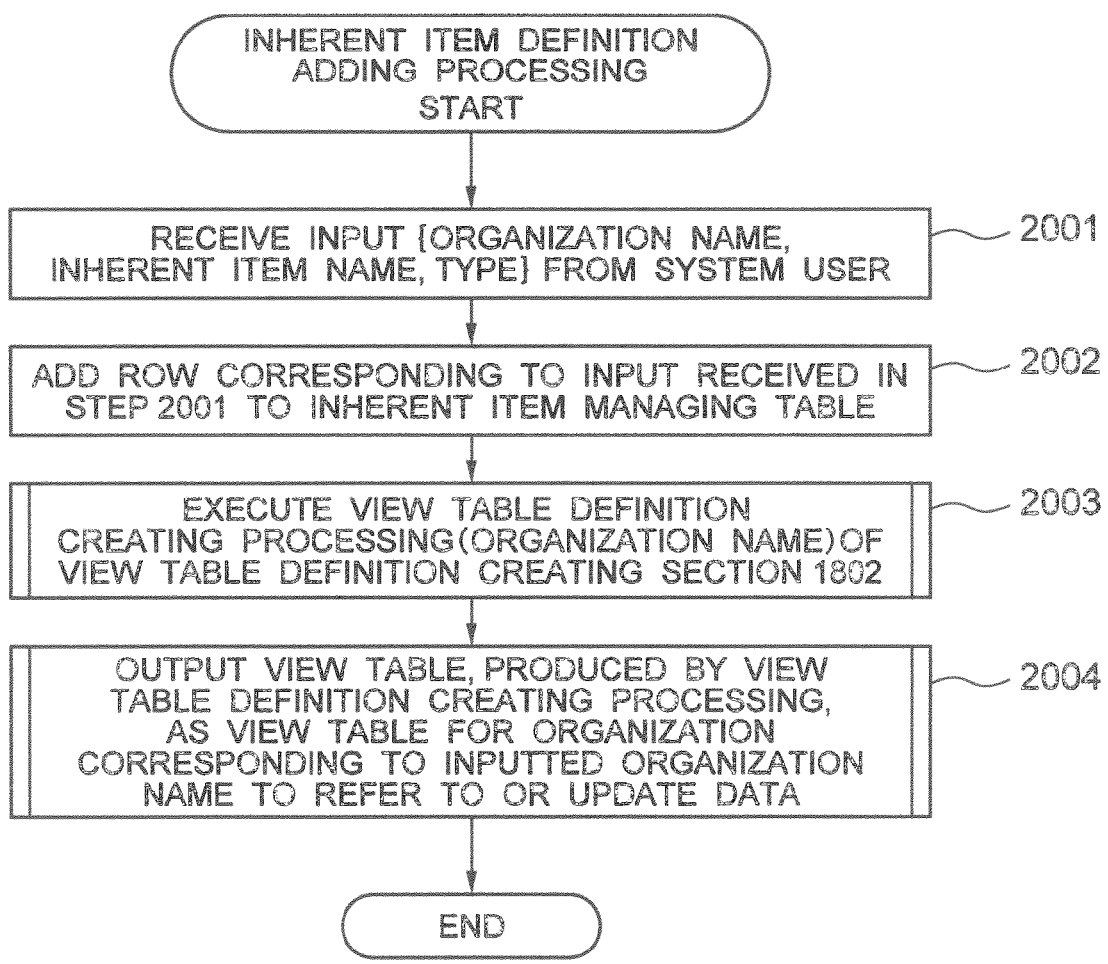
FIG. 20 is a flowchart showing a flow to add an inherent item in an inherent item defining section.

Referring to FIG. 20, description will be given of a flow of processing to add an inherent item definition by the inherent item defining section 1801.

As FIG. 20 shows, the defining section 1801 receives an organization name, an inherent item name, and a type from the system user (step 2001).

The inherent item defining section 1801 adds a row corresponding to the input received in step 2001 to the inherent item managing table 1810 (step 2002). Specifically, the input items including the organization name, the inherent item name, and the type are stored in the organization name 1901, the inherent item name 1902, and the type 1903 of a new row of the inherent item managing table 1810. A search is made through the inherent item table managing table 212 (FIG. 4) for a row having the same type 411 as the type 1903, and then the value of the inherent item table name 412 of the row is stored in the inherent item table name 1904.

Next, the view table definition creating section 1802 executes the view table definition creating processing (step 2003). As the input to the processing, the organization name received in step 2001 is set to the organization name. This processing will be described later in detail in conjunction with FIG. 21.

Finally, the view table outputted from the view table definition creating processing (step 2003) is outputted as a view table for the organization corresponding to the inputted organization name to refer to or to update data (step 2004).

Figure 21:
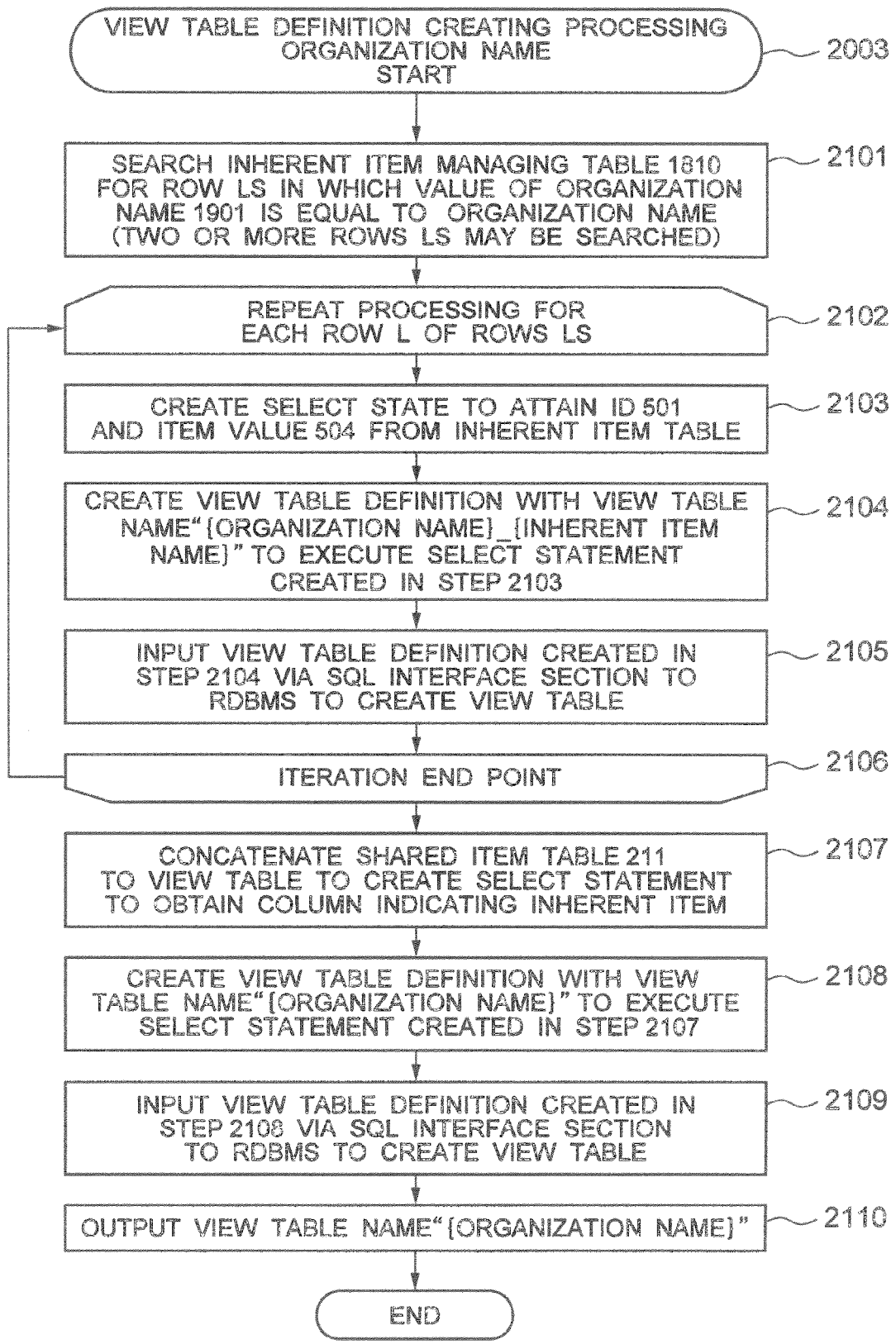
FIG. 21 is a flowchart showing a flow of view table definition creating processing in a view table definition creating section.
Figure 24:
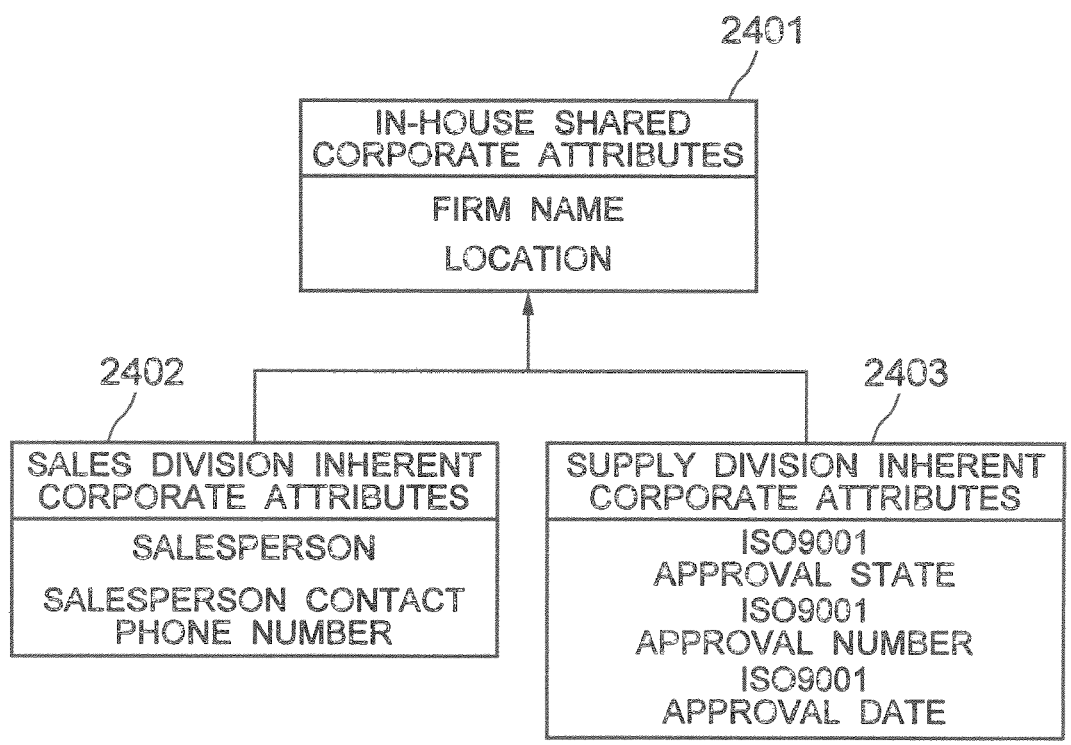
FIG. 24 is a diagram showing an example of class structure.
Figure 25:
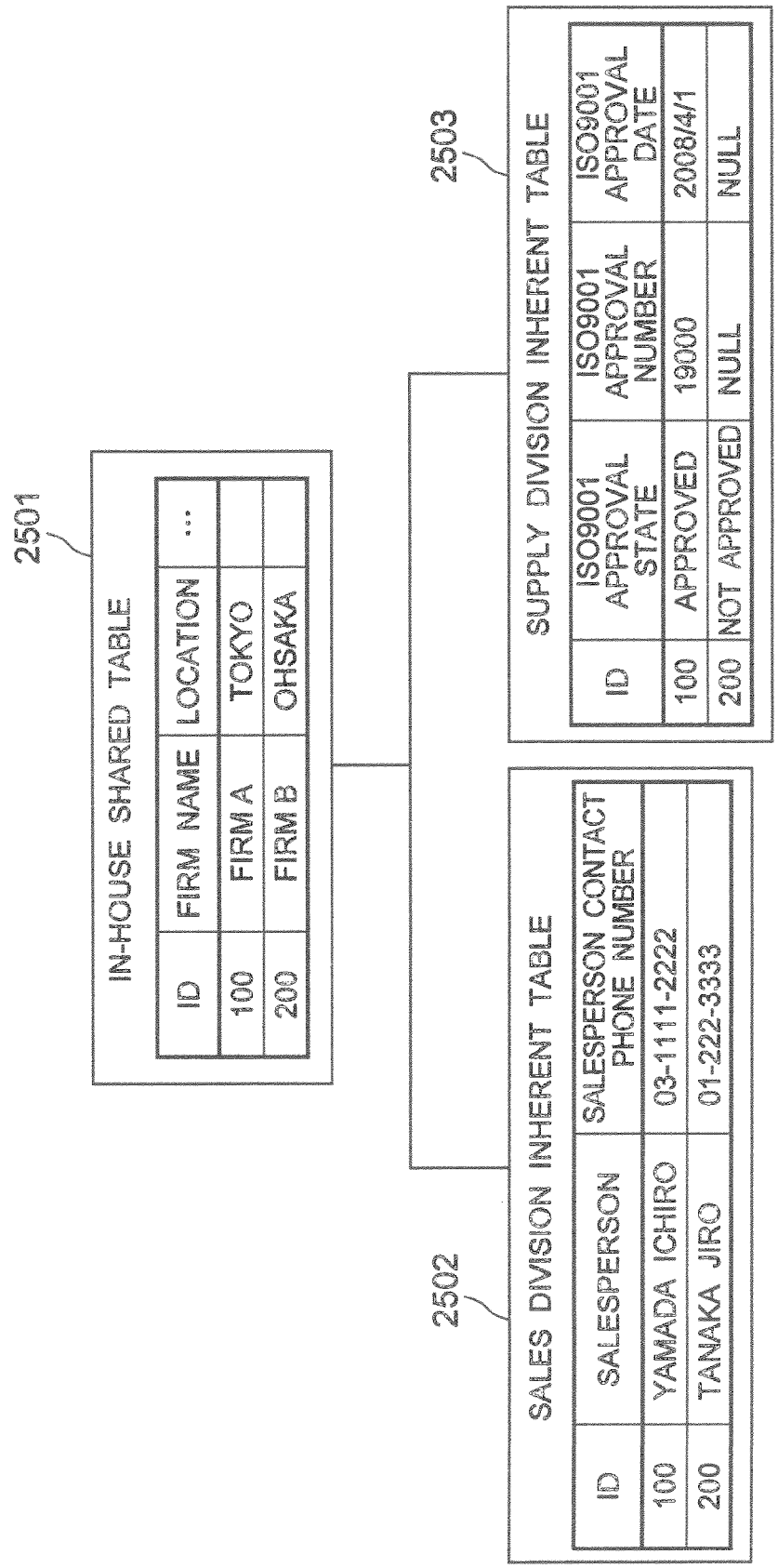
FIG. 25 is a diagram showing an example of a table layout when a table is allocated to each subclass.

Referring to FIG. 21 and FIGS. 22 and 23 showing examples of an SQL statement and the like, description will be given of the view table definition creating processing of the view table definition creating section 1802. As above, an organization name is inputted to this processing. The organization name is a name of an organization which uses the view table.

As FIG. 21 shows, a search is made through the inherent item managing table 1810 for a row LS in which the value of the organization name 1901 is equal to the inputted organization name in the view table definition creating processing (step 2110). A plurality of rows LS may possibly be retrieved depending on cases.

Next, for each row L of the rows LS, processing from step 2103 to step 2105 is repeatedly executed (steps 2102 to 2106).

First, an SQL SELECT statement is created (step 2103). This statement describes processing in which the view table definition creating section 1802 accesses the inherent item table (either one of three inherent item tables of the inherent item table 220) having the same name as the inherent item table name 1904 of the row L. The section 1802 then determines a row thereof in which the using organization 502 is equal to the input organization name and the value of the item name 503 is equal to that of the inherent item name 1902 of the row L and acquires the ID 501 and the item value 504 from the row. It is assumed that the column name of the item value 504 is the value of the inherent item name 1902.

For example, if the row Lisa row 1911 of the inherent item managing table 1810, the organization name 1901 is "sales", the inherent item table name 1904 is "VARCHAR-type inherent item table", and the inherent item name 1902 is "salesperson". When step 2103 is executed in this situation, there is created a SELECT statement to acquire the ID 501 and the item value 504 from a row of the VARCHAR-type inherent item table 221 (FIG. 5) in which the using organization is "sales" and the item name 503 is "salesperson". The column name of the item value 504 acquired by the SELECT statement is "salesperson". The second to fourth lines of an SQL statement example 2201 of FIG. 22 demonstrate an example of the SELECT statement.

Similarly, if the row L is a row 1912 of the inherent item managing table 1810, a SELECT statement corresponding to the second to fourth lines of an SQL statement example 2202 of FIG. 22 is created in step 2103.

Returning to FIG. 21, a view table definition to execute the SELECT statement created in step 2103 is generated with a view table name as "{organization name}_{inherent item name}" (step 2104). The inputted organization name is assigned to "{organization name}", and the inherent item name 1902 of the row L is assigned to "{inherent item name}".

For example, if the inputted organization name is "sales", the row L is the row 1911 of the inherent item managing table 1810 of FIG. 19, and the inherent item name 1902 is "salesperson", step 2104 produces a view table definition with the view table name "sales_salesperson" as shown in the SQL statement example 2201. In this situation, the view table is constructed as indicated by an example 2210 of the view table "sales_salesperson" of FIG. 22. Similarly, the definition of the view table "sales_salesperson contact phone number" produced when the row L is the row 1912 of the managing table 1810 of FIG. 19 is as indicated by the SQL statement example 2202 of FIG. 22. The table construction is as shown in an example 2220 of the view table "sales_salesperson contact phone number" of FIG. 22.

The view table definition created in step 2104 is inputted via the SQL interface section 231 to the RDBMS 230 to generate a view table (step 2105).

In step 2107, an SQL SELECT statement is created. In this statement, the shared item table 211 (FIG. 4) is concatenated to the view table "{organization name}_{inherent item name}" corresponding to the view table definitions created in step 2104 by a row having the same ID 2211 as the ID 401 of the shared item table 211 to resultantly obtain all items (columns) of the shared item table 211 and columns representing the inherent items of all view tables "{organization name}_{inherent item name}".

For example, if the inherent item managing table 1810 is as shown in FIG. 19 and the inputted organization name is "sales", the shared item table 211 (FIG. 4) is concatenated to the view table "sales_salesperson" 2210 and the view table "sales_salesperson contact phone number" by use of a row having the same ID 2211 as the ID 401 of the shared item table 211 to thereby create a SELECT statement to obtain the shared item table 211, the salesperson 2212, and the salesperson contact phone number 2213. The SELECT statement corresponds to second to fourth lines of an SQL statement example 2203 of FIG. 23.

Next, a view table definition to execute the SELECT statement created in step 2107 is generated with the view table name "{organization name}" (step 2108). For example, if the inputted organization name is "sales", the definition is created with the view table name "sales". An SQL statement example of the view table definition thus created is indicated by an SQL statement example 2203 of FIG. 23, and the view table configuration is indicated by a view table "sales" of FIG. 23.

The view table definition generated in step 2108 is inputted via the SQL interface section 231 to the RDBMS 230a (230) to produce a view table (step 2109).

Finally, a view table name "{organization name}" is outputted as a result of the view table definition creating processing (step 2110).

As above, according to the second embodiment of the present invention, when an inherent item definition is added by use of the inherent item defining section 1801, the view table definition creating section 1802 outputs a view table including shared and inherent items. The business applications 251, 261, and 171 can refer to or update the data including shared and inherent items via the view table.

In the operation, like the first embodiment, it is not required that the second embodiment takes the configurations of the shared item table 211 and the inherent item table 220 into consideration. Also, it is not required to discriminate the shared items from the inherent items.

One aspect of the first and second embodiments of the present invention resides in that the construction of the inherent item table 220 (FIG. 5) is kept unchanged even if an organization is added. Hence, even if an inherent item to be used only by an organization is changed (addition, deletion, or content change), the other organizations and the operation of the data processing system are little affected.

Another aspect of the embodiments resides in that thanks to the table virtualizing section 201 and the table view virtualizing section 1800, the business applications (the sales division customer managing application 110 and the supply division order application 120) can refer to and update data as in the conventional way without taking the configurations of the shared item table 211 and the inherent item table 220 into consideration. This resultantly leads to advantages as follows. It is not required to develop a new business application. Further, it is not required to change operation of the business applications.

Specifically, for example, to serve as an interface described above, the table virtualizing section 201 provides an operation to refer to data as below. By receiving as inputs thereto an output item name in which shared and inherent items are designated without any discrimination therebetween, a search conditional expression including shared and inherent items without any discrimination, and an organization, the table virtualizing section 201 retrieves a record for which the search conditional expression is satisfied, and then outputs, based on the designated output item name, a record including item columns of shared and inherent items.

To provide the operation, the table virtualizing section 201 includes the four processing groups: item type judge processing (FIG. 8), conversion processing of inherent item referring processing (FIG. 9), conversion processing of shared item referring processing (FIG. 10), and record output processing (FIG. 12).

In the item type judge processing, an item type is judged for an inputted output item name and an item name included in a search conditional expression. Specifically, whether or not the item name is associated with a shared item or an inherent item is judged according to schema information of the shared item table.

In the conversion processing of inherent item referring processing, for an item judged as an inherent item, an inherent item search conditional expression is created to retrieve a row in which an inputted organization name and the name of the item judged as an inherent item match the organization name and the item name of the inherent item table.

In the conversion processing of shared item referring processing, based on an inputted search conditional expression, there is created a shared item search conditional expression including only the items judged as shared items.

In the record output processing, a record attained from the shared item table by use of a shared item search conditional expression is concatenated, based on the inputted output item name, to the values of inherent items obtained from records of the inherent item table for which an inherent item search conditional expression is satisfied, to resultantly output a record including shared and inherent items.

In addition, the interface provided by the table virtualizing section 201 also provides an operation to update data. Specifically, the table virtualizing section 201 updates the shared and inherent item tables by using, as inputs thereto, a record including an ID and values of shared and inherent items designated without discrimination therebetween.

To provide the operation, the table virtualizing section 201 includes the three processing groups: Record dividing processing (processing 1321 of FIG. 13), shared item record update processing (FIG. 16), and inherent item record update processing (FIG. 17).

In the record dividing processing, whether an item of an inputted record is a shared item or an inherent item is judged on the basis of schema information of the shared item table to resultantly generate a shared item record including only shared items and an inherent item record including only inherent items.

In the shared item record update processing, the shared item table is updated by using a shared item record.

In the inherent item record update processing, based on each column of an inherent item record, there is created a record including an ID, an organization name, an item name, and an item value to update the inherent item table.

Description has been given of embodiments of the present invention. However, the present invention is not restricted by the embodiments. The embodiments may be appropriately modified and changed, for example, in the hardware configurations and the contents of the flowcharts without departing from the range of the present invention.

The invention claimed is:

1. In a data processing system comprising a data processing apparatus comprising a Relational Data Base Management System (RDBMS) storing information shared among a plurality of organizations and a business application execution apparatus which is employed when either one of the organizations uses the information stored in the RDBMS of the data processing apparatus and which is communicably connected to the data processing apparatus, a data processing method for use with the data processing apparatus, wherein:

the information is identified by an Identification (ID) and includes a plurality of data items;

the data processing apparatus stores in the RDBMS shared item information for storing the ID and a shared item value as a value of a shared item which is a data item shared among the plural organizations and inherent item information for storing the ID, an organization name as a name of the organization, an inherent item name as a name of an inherent item which is a data item to be referred to and to be updated by an organization corresponding to the organization name, and an inherent item value as a value of the inherent item;

the data processing apparatus comprises a table virtualizing section for outputting; based on an input from the business application execution apparatus, the input including an output item name including the shared items and the inherent items designated without discrimination therebetween, a search conditional expression including the shared items and the inherent items without discrimination therebetween, and the organization name; a record including the shared items and the inherent items without discrimination therebetween to the business application execution apparatus; and in the table virtualizing section
an item type judge processing section judges an item type to determine whether each of the output item name thus inputted and the data item included in the search conditional expression is a shared item or an inherent item by referring to the shared item information,
an inherent item referring conversion processing section creates, for the data item judged as an inherent item by the item type judge processing section, an inherent item search conditional expression to search the inherent item information for a part thereof associated with an organization name and an inherent item name matching the organization name thus inputted and an inherent item name of the data item judged as an inherent item,
a shared item referring conversion processing section creates, based on the search conditional expression thus inputted, a shared item search conditional expression including only data items judged as shared items by the item type judge processing section, and
a record output processing section concatenates, based on the output item name, a record obtained from the shared item information by use of the shared item search conditional expression to an inherent item value which has an IO substantially equal to an IO of the record and which is obtained from the inherent item information by use of the inherent item search conditional expression to produce a concatenated result, and outputs therefrom the concatenated result as a record including the shared items and the inherent items.

2. A data processing system according to claim 1, wherein:
the table virtualizing section comprises a function to update, based on the record which is inputted from the business application execution apparatus and which includes the organization name, the data item including the shared items and the inherent items designated without discrimination therebetween, the value of the data item, and the IO; the shared item value and the inherent item value of information having an IO substantially equal to the 10 stored in the RDBMS; and
in the table virtualizing section,
a record dividing processing section judges, by referring to the shared item information, an item type of the data item of the record thus inputted, divides the record into a shared item record including data items of the shared item and an inherent item record including data items of the inherent item, a shared item record update processing section updates the shared item information based on the shared item record, and
an inherent item record update processing section expands the inherent item record into a record including the ID, the organization name, the inherent item name, and the inherent item value and updates the inherent item information by use of the record obtained by expanding the inherent item record.

3. A data processing system according to claim 1, wherein:
the inherent item information includes a plurality of groups of inherent item information according to inherent item types, and each of the groups is assigned with a name;
the data processing apparatus further comprises inherent item information managing information to store the inherent item types and the inherent item information names with a relationship established therebetween; and
the table virtualizing section acquires, to employ the inherent item information, a name of the inherent item information from the inherent item information managing information according to a type of the inherent item value, selects inherent item information corresponding to the name from the inherent item information, and uses the selected information.

4. A data processing system according to claim 1, wherein:
a processing procedure of the table virtualizing section is stored as a view information definition of the RDBMS in a storage disposed in the data processing apparatus; and
the RDBMS executes the processing procedure of the table virtualizing section based on the view information definition.

5. A data processing apparatus comprising a Relational Data Base Management System (RDBMS) storing information shared among a plurality of organizations for use in a data processing system comprising the data processing apparatus and a business application execution apparatus which is employed when either one of the organizations uses the information stored in the RDBMS of the data processing apparatus and which is communicably connected to the data processing apparatus, wherein:
the information is identified by an Identification (ID) and includes a plurality of data items;
the data processing apparatus stores in the RDBMS
shared item information for storing the ID and a shared item value as a value of a shared item which is a data item shared among the plural organizations and inherent item information for storing the ID, an organization name as a name of the organization, an inherent item name as a name of an inherent item which is a data item to be referred to and to be updated by an organization corresponding to the organization name, and an inherent item value as a value of the inherent item;
the data processing apparatus comprises a table virtualizing section for outputting; based on an input from the business application execution apparatus, the input including an output item name including the shared items and the inherent items designated without discrimination therebetween, a search conditional expression including the shared items and the inherent items without discrimination therebetween, and the organization name; a record including the shared items and the inherent items without discrimination therebetween to the business application execution apparatus; and
the table virtualizing section comprises
an item type judge processing section for judging an item type to determine whether each of the output item name thus inputted and the data item included in the search conditional expression is a shared item or an inherent item by referring to the shared item information, an inherent item referring conversion processing section for creating, for the data item judged as an inherent item by the item type judge processing section, an inherent item search conditional expression to search the inherent item information for a part thereof associated with an organization name and
an inherent item name matching the organization name thus inputted and an inherent item name of the data item judged as an inherent item, a shared item referring conversion processing section for creating, based on the search conditional expression thus inputted, a shared item search conditional expression including only data items judged as shared items by the item type judge processing section, and
a record output processing section for concatenating, based on the output item name, a record obtained from the shared item information by use of the shared item search conditional expression to an inherent item value which has an ID substantially equal to an ID of the record and which is obtained from the inherent item information by use of the inherent item search conditional expression to produce a concatenated result, and outputting therefrom the concatenated result as a record including the shared items and the inherent items.

6. A data processing apparatus according to claim 5, wherein the table virtualizing section comprises:

a function to update, based on the record which is inputted from the business application execution apparatus and which includes the organization name, the data item including the shared items and the inherent items designated without discrimination therebetween, the value of the data item, and the ID; the shared item value and the inherent item value of information having an ID substantially equal to the ID stored in the RDBMS;

a record dividing processing section for judging, by referring to the shared item information, an item type of the data item of the record thus inputted, dividing the record into a shared item record including data items of the shared item and an inherent item record including data items of the inherent item;

a shared item record update processing section for updating the shared item information based on the shared item record; and an inherent item record update processing section for expanding the inherent item record into a record including the ID, the organization name, the inherent item name, and the inherent item value and updating the inherent item information by use of the record obtained by expanding the inherent item record.

7. A data processing apparatus to claim 5, wherein:

the inherent item information includes a plurality of groups of inherent item information according to inherent item types, and each of the groups is assigned with a name;

the data processing apparatus further comprises inherent item information managing information to store the inherent item types and the inherent item information names with a relationship established therebetween; and the table virtualizing section acquires, to employ the inherent item information, a name of the inherent item information from the inherent item information managing information according to a type of the inherent item value, selects inherent item information corresponding to the name from the inherent item information, and uses the selected information.

8. A data processing apparatus according to claim 5, wherein:

a processing procedure of the table virtualizing section is stored as a view information definition of the RDBMS in a storage disposed in the data processing apparatus; and the RDBMS executes the processing procedure of the table virtualizing section based on the view information definition.

9. A non-transitory computer-readable medium comprising program code embodied therein that, when executed, performs the data processing method according to claim 1.

* * * * *